United States Patent [19]
Markowski

[11] 3,919,840
[45] Nov. 18, 1975

[54] COMBUSTION CHAMBER FOR DISSIMILAR FLUIDS IN SWIRLING FLOW RELATIONSHIP

[75] Inventor: Stanley J. Markowski, East Hartford, Conn.

[73] Assignee: United Technologies Corporation, Hartford, Conn.

[22] Filed: Nov. 12, 1973

[21] Appl. No.: 415,257

Related U.S. Application Data

[62] Division of Ser. No. 352,137, April 18, 1973, Pat. No. 3,792,582, which is a division of Ser. No. 84,086, Oct. 26, 1970, Pat. No. 3,788,065.

[52] U.S. Cl. ............................................. 60/39.65
[51] Int. Cl.² .......................................... F02C 1/00
[58] Field of Search............. 60/39.65, 39.69, 39.72

[56] References Cited
UNITED STATES PATENTS

| | | | |
|---|---|---|---|
| 2,332,866 | 10/1943 | Muller | 60/39.65 |
| 3,393,516 | 7/1968 | Markowski | 60/261 |
| 3,540,216 | 11/1970 | Quillevere et al. | 60/39.72 |

*Primary Examiner*—Samuel Feinberg
*Attorney, Agent, or Firm*—Vernon F. Hauschild

[57] ABSTRACT

The characteristics of thermodynamically and aerodynamically dissimilar fluids in swirling flow relationship are established and/or varied to accelerate mixing and hence combustion in the combustion zone and mixing and hence cooling of the products of combustion, in the dilution zone of an annular burner.

2 Claims, 49 Drawing Figures

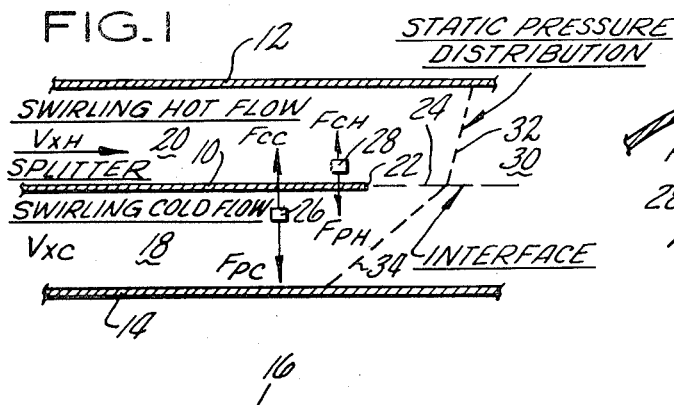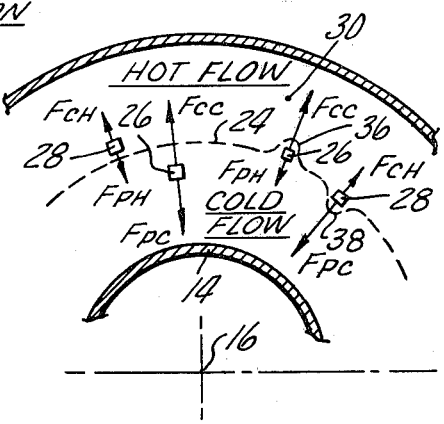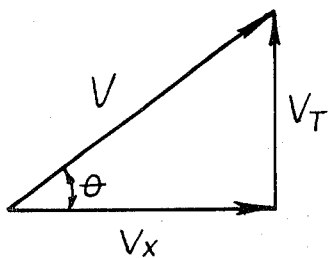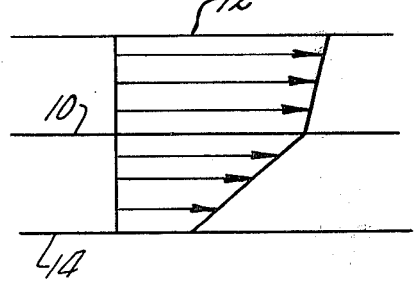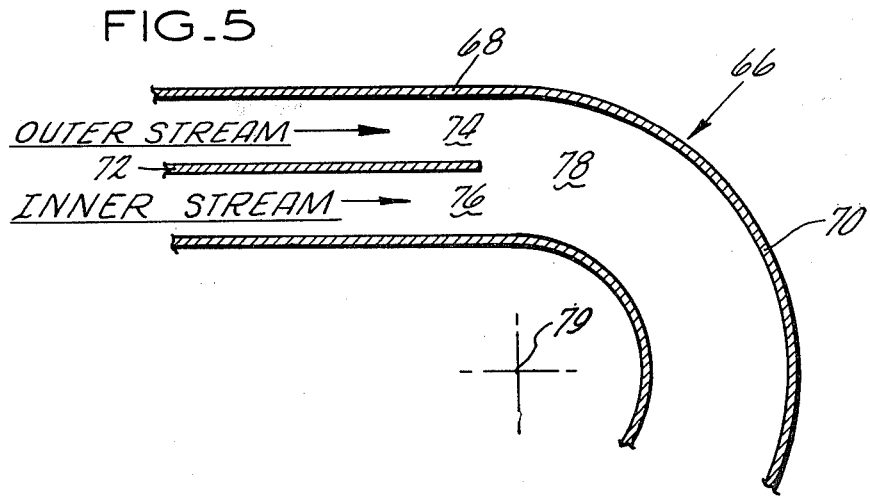

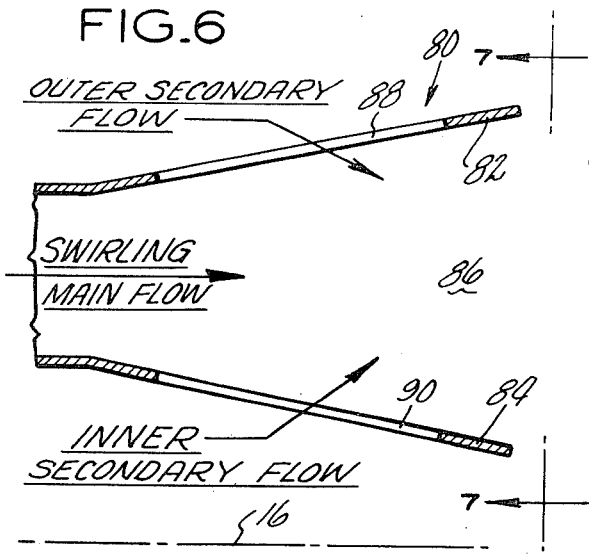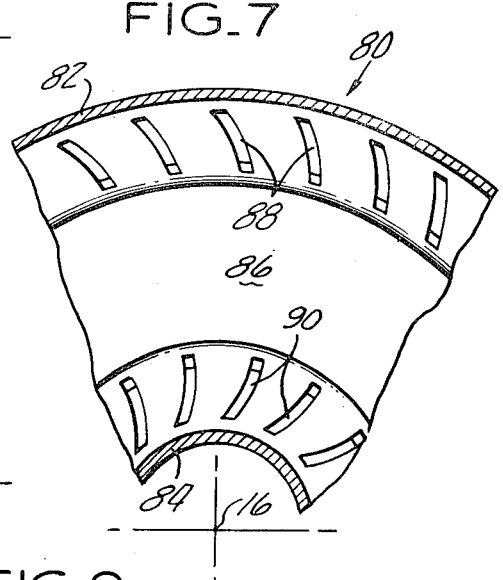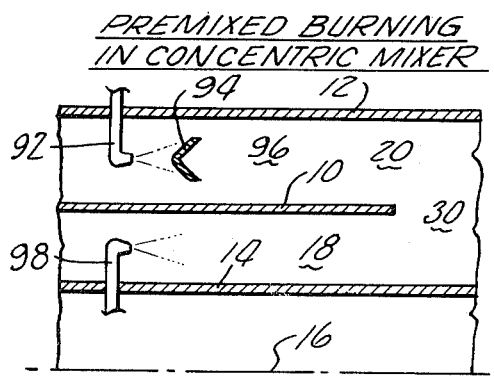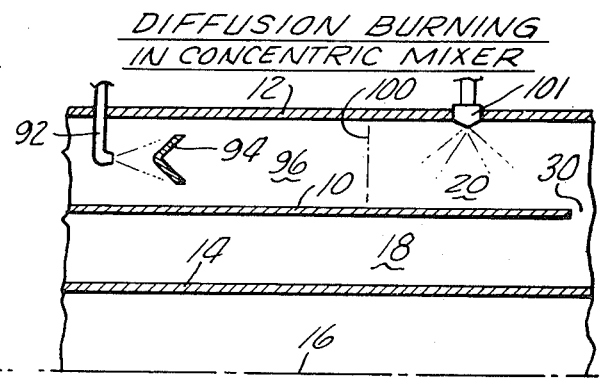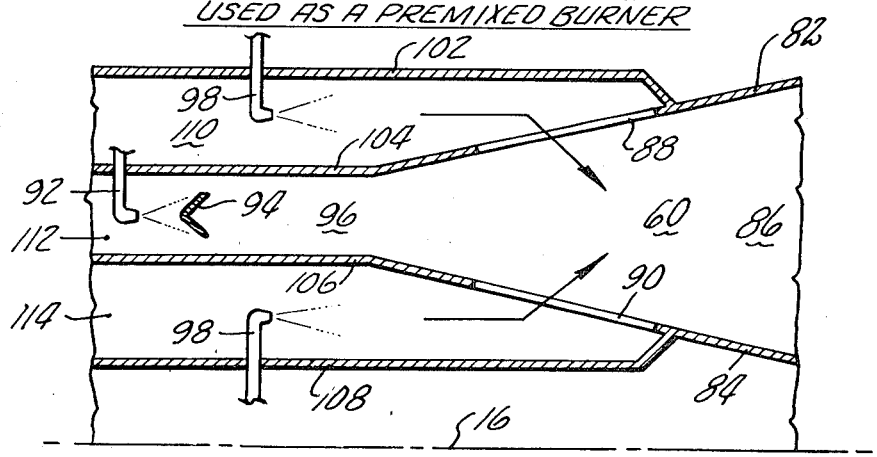

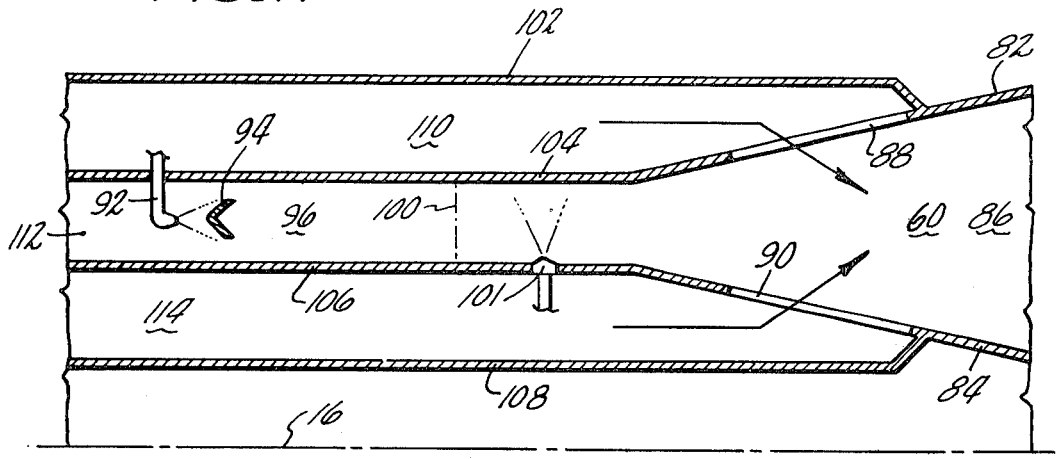
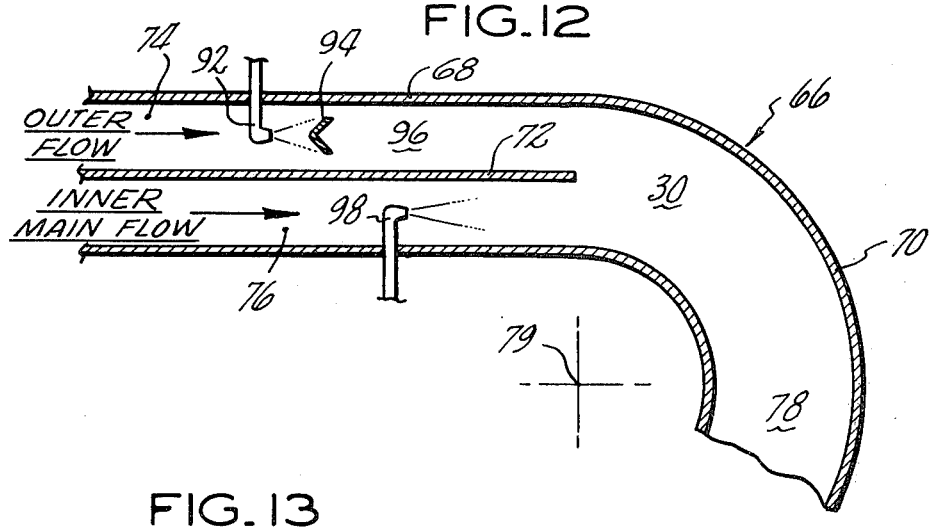
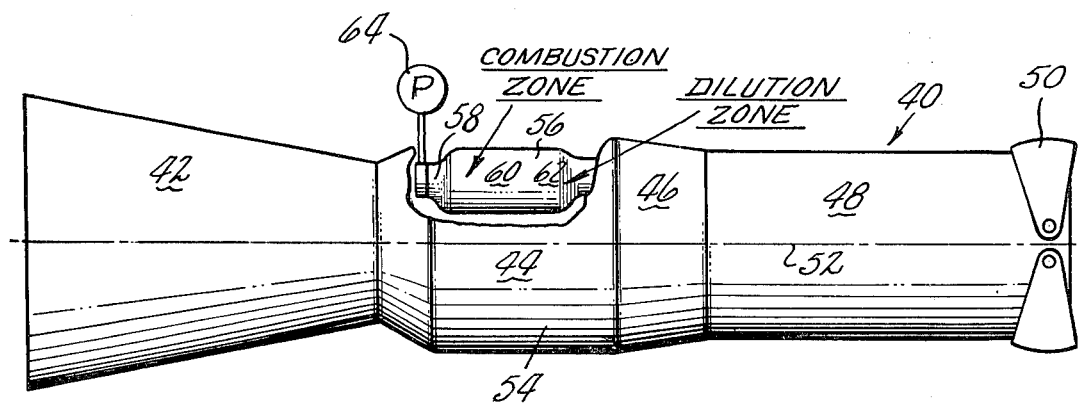

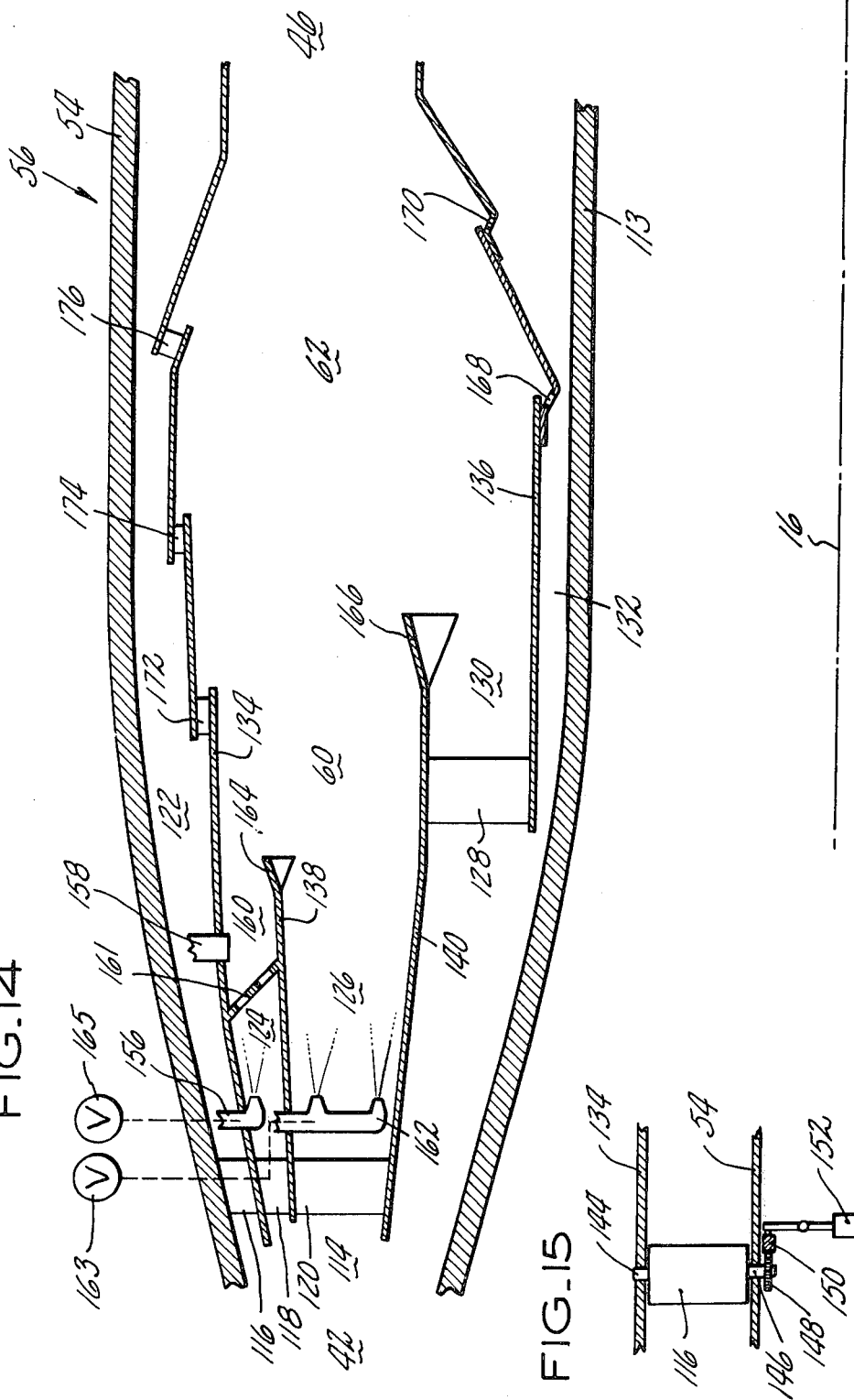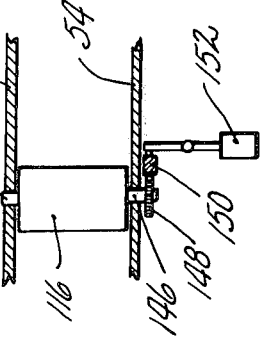

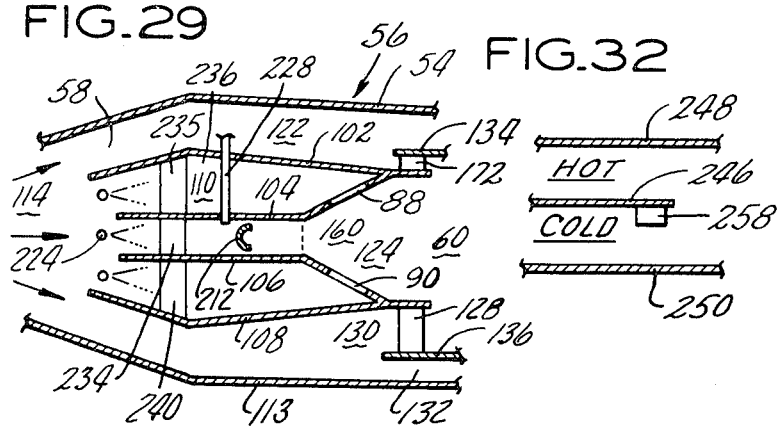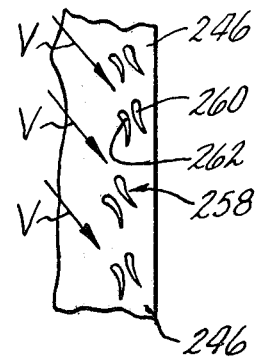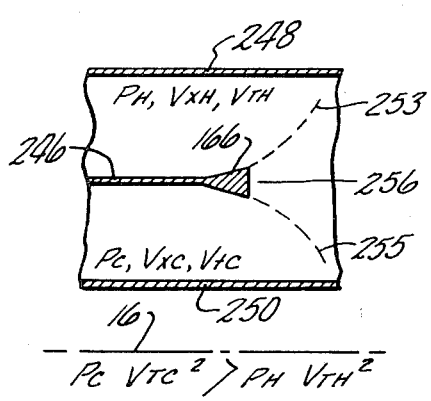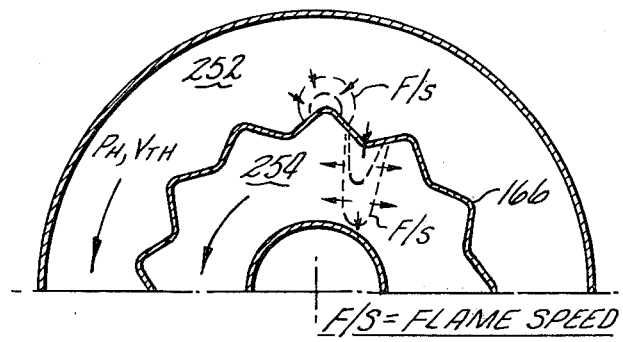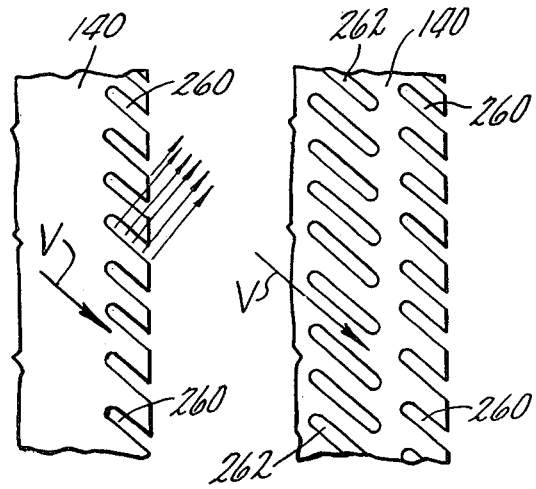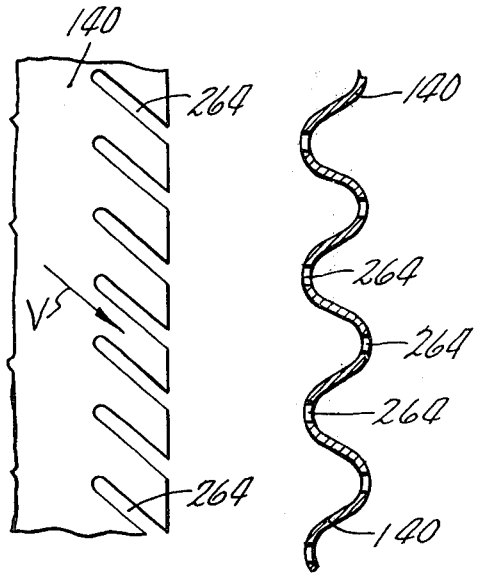

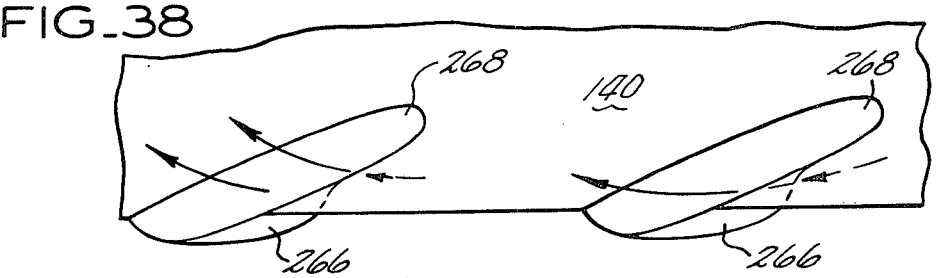
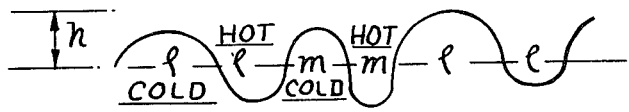
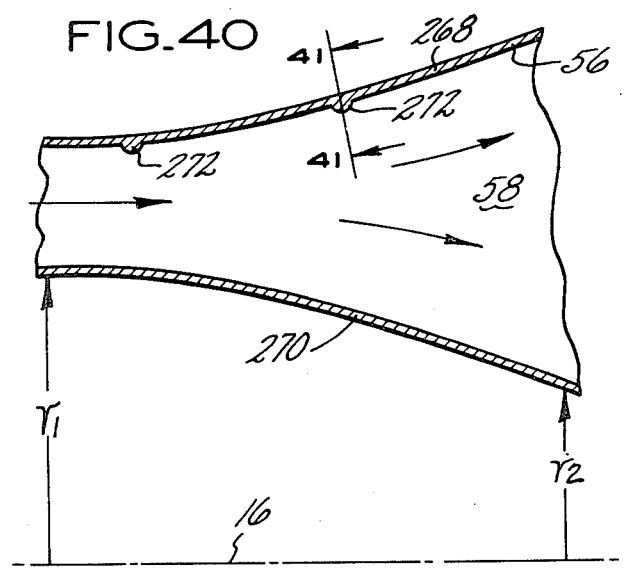
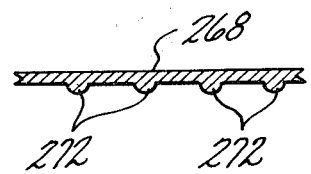
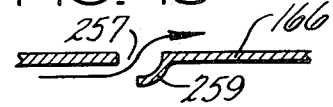
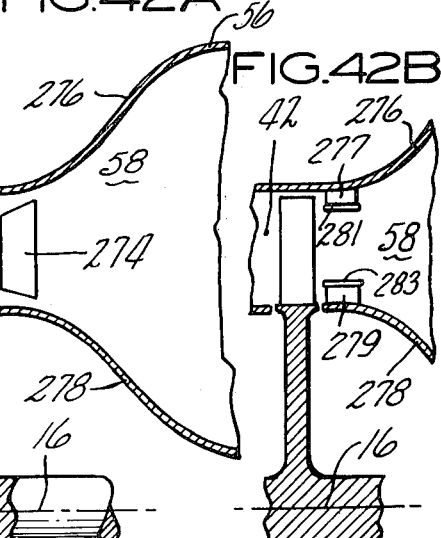
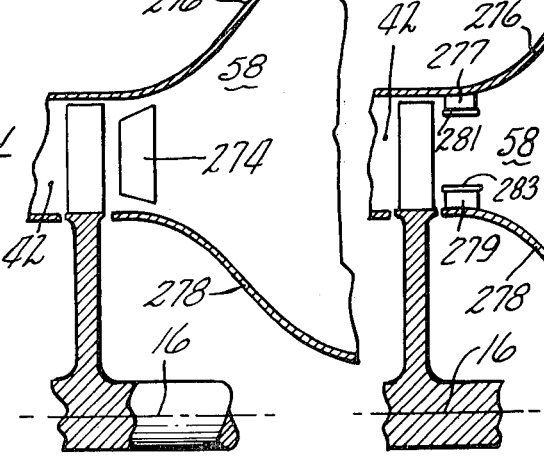
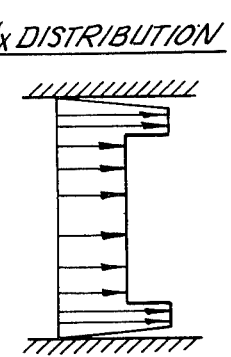
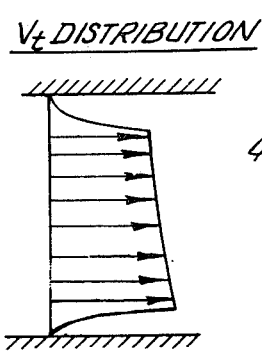

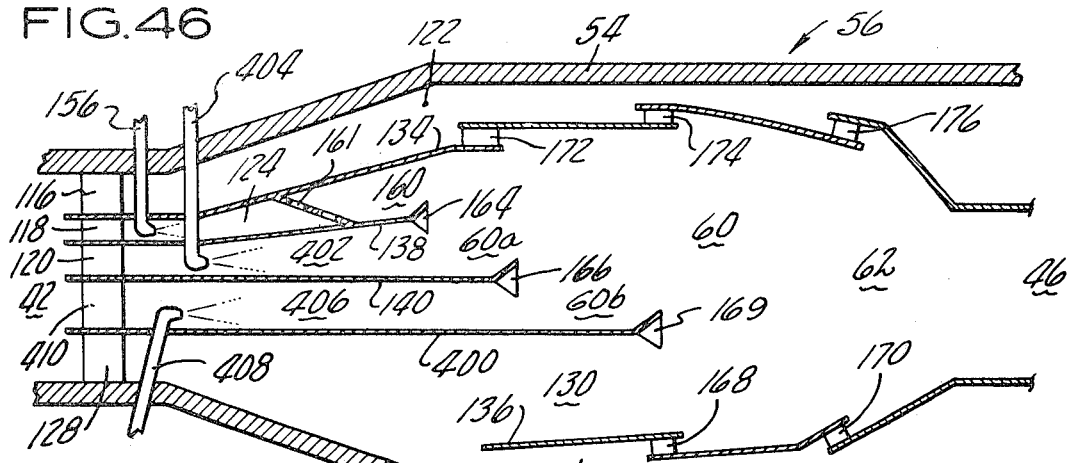
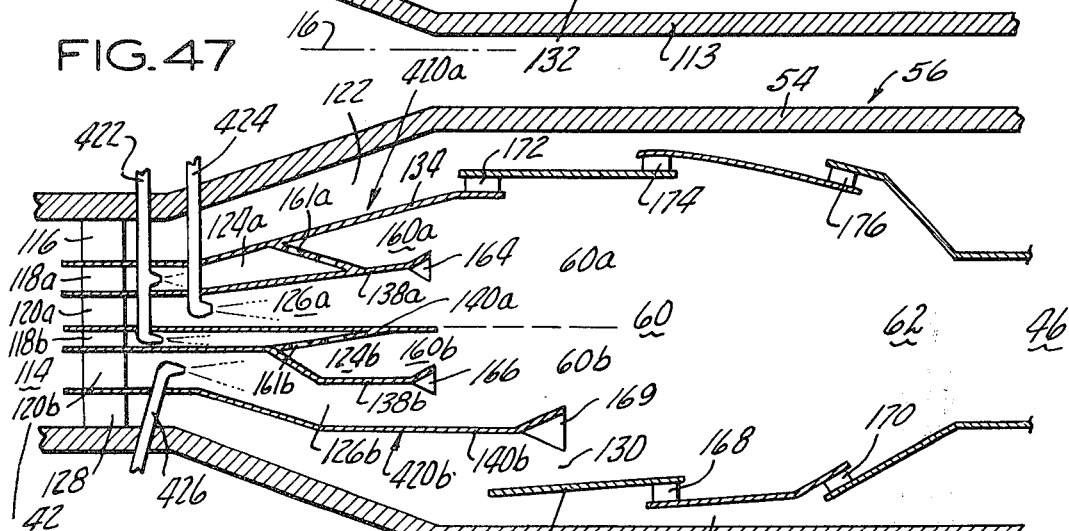
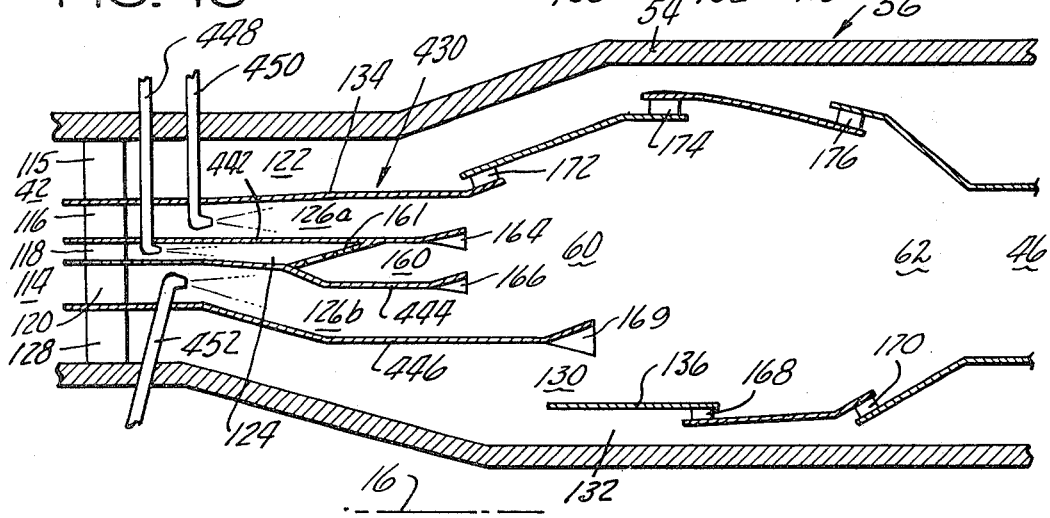

COMBUSTION CHAMBER FOR DISSIMILAR FLUIDS IN SWIRLING FLOW RELATIONSHIP

This is a division, of application Ser. No. 352,137 filed Apr. 18, 1973 which has matured into U.S. Pat. No. 3,792,582 which is a division of Ser. No. 84,086 which has matured into U.S. Pat. No. 3,778,065.

CROSS-REFERENCES TO RELATED APPLICATIONS

This application contains subject matter related to the following two patents assigned to the same assignee: 1. U.S. Pat. No. 3,701,255, issued Oct. 31, 1972 for "Shortened Afterburner Construction for Turbine Engine" and 2. U.S. Pat. No. 3,675,419, issued July 11, 1972 for "Combustion Chamber Having Swirling Flow."

BACKGROUND OF THE INVENTION

1. Field of the Invention

This invention relates to the controlled mixing of two thermodynamically and aerodynamically dissimilar fluids and particularly to the use of swirling flow between two dissimilar fluids in annular combustion chambers, such as the burners and afterburners of turbine engines, to accelerate both the combustion process and the temperature reduction process of the products of combustion in the dilution of the burner.

2. Description of the Prior Art

In the combustion chamber and burner art, it has been conventional to burn in a cylindrical chamber by discharging an atomized fuel spray into the center thereof with air being discharged therearound through a vaned cascade at tangential velocity $V_t$ so as to form a recirculation zone of the atomized fuel and swirling air so mixing. This recirculation zone is formed because the angular momentum of the air is proportional to the tangential velocity $V_t$ thereof times the radius of the air particle involved from the burner central axis, accordingly, any air which is at or near the burner axis is of minimal or zero radius so that the tangential velocity attempts to go to infinity with the result that non-swirling secondary air is brought in around the recirculation zone for mixing with the stagnated fuel-air mixture downstream of the recirculation zone and for cooling the walls of the combustion chamber, as typically shown in U.S. Pat. No. 3,498,055.

These prior art burners are called "can burners," because of their cylindrical shape, or "can-annular burners," because they have a series of can-shaped inlet sections opening into an annular main section. The momentum-velocity system of establishing a recirculation zone is used in the can portion of both.

The momentum-velocity system of establishing a recirculation zone does not work in an annular combustion chamber because all combustion stations are of substantial radius and therefore I utilize the interdigitation of the swirling sheets of dissimilar fluids to perform this function.

The U.S. Pat. Nos. to Johnson No. 3,030,773 and Sanborn 2,473,347 utilize swirling flow in combustion chambers but it will be noted that these are cylindrical or can type combustion chambers and that none of this prior art teaches the use of establishing an unstable interface between two swirling dissimilar fluids for the purpose of accelerating mixing and combustion therebetween by the establishing and/or control of the fluid density and tangential velocity $V_t$ to produce dissimilar product parameters $\rho V_t^2$ between the two fluids. The conventional can or cylindrical burner is shown in afterburner form in U.S. Pat. No. 2,934,894.

Other than the aforementioned type of swirling flow to assist in establishing a recirculation zone in a cylindrical or can burner or in an annular burner having a plurality of substantially cylindrical, circumferentially extending can burner spray nozzles positioned circumferentially thereabout as in U.S. Pat. No. 3,000,183, swirling flow is generally discouraged in conventional combustion chambers and straightening vanes are provided for this purpose.

Swirling flow has been suggested for combustion chambers in certain patents, however, including Ferri et al U.S. Pat. No. 2,755,623 which teaches the concept of causing the fuel-air mixture passing through a combustion chamber to flow in swirling motion so as to improve combustion, however, it should be noted that in the Ferri et al patent there is but a single swirling stream and he therefore does not achieve the mixing and accelerated combustion advantages of my invention. The patent to Meurer U.S. Pat. No. 3,078,672 causes swirling air to be passed through a can-type burner and causes a solid sheet or film of fuel to be passed along the inner surface of the burner outer wall to be vaporized and to burn with the swirling air at the outer wall. Combustion takes place at the interface between the air and the fuel at the outer wall of the combustion chamber and the products of combustion more inwardly to be gathered and recycled through duct 22. Meurer clearly does not teach the concept of mixing and combusting two dissimilar fluids by control of the parameter products taught herein. My U.S. Pat. No. 3,393,516 illustrates curved flow in an exhaust gas deflector of a turbo-fan engine but it should be noted that there is no mixing and combustion in connection with the curved flow, in fact, such would be undesirable.

SUMMARY OF THE INVENTION

A primary object of the present invention is to provide a mixer configuration which can be used to increase mixing between dissimilar swirlig flow fluids in the combustion zone of an annular combustion chamber to accelerate combustion by increasing the mixing rate between the cool fuel-air mixture and the hot gases and which can also be used to accelerate mixing in the dilution zone of an annular combustion chamber between the products of combustion and the cooling air to accelerate temperature reduction. Combustion is mixing limited. The time or burner length required to obtain complete combustion can be limited by that necessary to mix together the hot gases and the cool fuel-air mixture. Accelerated mixing in both the combustion and dilution zones will shorten the length of the combustion chamber and hence shorten the length and weight of the engine.

A primary object of the present invention is to provide an improved annular combustion chamber by establishing, controlling and/or varying the product parameter $\rho V_t^2$, where $\rho$ is fluid density and $V_t$ is fluid tangential velocity, between two dissimilar swirling fluids to establish an unstable interface therebetween to accelerate mixing and hence combustion in the combustion zone and mixing and hence cooling the dilution zone of the combustion chamber.

In accordance with the present invention, this product parameter is established, controlled and/or varied so that the product parameter of the fluid which is flowing at the lesser radius about the combustion chamber axis is greater than the product parameter of the fluid which is flowing at the greater radius, so that the mixing ratio in the combustion chamber is determinend by the ratio $\rho V_t^2$ (inner flow) $\div \rho V_t^2$ (outer flow).

In accordance with a further aspect of the present invention, the interface between two dissimilar swirling combustion chamber fluids are established or controlled so that outside-inside burning occurs in the combustion chamber.

The invention permits accelerated mixing and combustion or accelerated and dilution to occur in several annular combustion configurations, for example, in the concentric flow mixer configuration, the "barberpole" mixer configuration, and the bent tube or folded combustion chamber mixer configuration.

In accordance with a further aspect of the present invention, a combustion chamber can be fabricated so as to consist of a combuston zone and a dilution zone with either or both of these zones utilizing a concentric mixer, a barberpole mixer, or a bent tube mixer and any of these mixers can be used with a conventional combustion zone or dilution zone.

It is a further aspect of the present invention that utilizing any of these mixing constructions, combustion can take place utilizing either the premixed or diffusion principle.

It accordance with a further aspect of this invention, hardware is provided to establish, control or vary the orientation of two concentric fluid streams of different thermodynamic and aerodynamic states in such as way that the product density, $\rho$, of the inner stream times the tangential velocity $V_t$ of the inner stream is greater than the corresponding product parameter of the outer stream.

In accordance with still a further feature of the present invention, compound mixing in radial, parallel staging occurs both in the combustion zone and the dilution zone of an annular combustion chamber in which the combustion zone and the dilution zone are axially staged in series so as to reduce the overall length of the combustion chamber and hence the engine length and weight.

In accordance with still a further feature of this invention, several modifications of the pilot combustion zone in a concentric mixer for a primary combustion zone are usable and of advantage depending upon the particular requirements of the combustion chamber configuration involved.

In accordance with still a further aspect of the present invention, triggers are used to disturb the unstable interface between two swirling streams and to accelerate mixing and either combustion or cooling therebetween.

In accordance with still a further aspect of this invention, a combination flameholder and/or trigger can be used in a swirling flow annular combustion chamber to accelerate mixing and burning of the products of combustion from the recirculation zone established downstream of the flameholder and the fuel-air mixture passing around the flameholder.

In accordance with still a further feature of this invention, swirling fluid interface trigger mechanisms are provided in the form of a corrugated and tapered rings, which may have holes or scoops therein for noise deadening and trigger mechanisms cooling purposes.

In accordance with still a further feature of this invention, combustion apparatus is provided in which combustion or dilution zones are located in series in which mixing occurs in both zones at parallel radial stations.

In accordance with a further teaching of this invention, the unstable interface between two swirling streams of fluid which are established by the product parameter criterion taught herein can be physically interrupted by a variety of trigger mechanisms.

It is a further teaching of this application to establish a stable interface criteria between the cooling air for a combustion chamber liner and the products of combustion.

In accordance with still a further feature of my invention, swirling flow in an annular combustion chamber invites the use of flameholders therein and the use of a substantial variety of fuel injecting devices to be used therewith.

BRIEF DESCRIPTION OF THE DRAWINGS

FIG. 1 is a schematic representation of two dissimilar fluids flowing in swirling relationship in separated coannular passages and then joining and mixing in a single annular passage.

FIG. 2 is a schematic showing in cross-section of the FIG. 1 flow representation.

FIG. 3 is a vector diagram of the fluid flowing in swirling fashion in the FIG. 1 and 2 environment and the other environments disclosed herein.

FIG. 4 is a showing of the static pressure distribution across the outer and inner swirling fluid flows of the FIG. 1 and 2 environment.

FIG. 5 is a schematic representation of mixing occurring in two fluid streams flowing in side-by-side relationship and which are caused to swirl in passing through a bent tube.

FIG. 6 is a schematic cross-sectional showing of a "barberpole" swirl mixer.

FIG. 7 is an end view taken along line 7—7 of FIG. 6.

FIG. 8 is a showing of an annular combustion chamber concentric mixer utilizing the premixed burning principle.

FIG. 9 is similar to FIG. 8 but utilizing the diffusion burning principle.

FIG. 10 is a cross-sectional showing of an annular combustion chamber barberpole mixer used in the combustion zone and utilizing the premixed burning principle.

FIG. 11 is similar to FIG. 10 but utilizing the diffusion burning principle.

FIG. 12 is a showing of a premixed combustor employing bent tube mixing in a folded combustion chamber which is preferably of the annular type.

FIG. 13 is a showing of a modern turbine engine of the type used in the modern aircraft and shown utilizing my invention.

FIG. 14 is a cross-sectional showing of an annular combustion chamber using a concentric mixer in both the combustion zone and the dilution zones.

FIG. 15 is a showing of a vane of an annular cascade and its actuating mechanism to make the cascade variable angle so as to vary the angle at which the gases passing therethrough are discharged.

FIg. 29 is still another modification for the primary combustion chamber shown in FIG. 14.

FIG. 30 is a schematic representation of two swirling fluid flowing through annular passages with a splitter duct therebetween and with a trigger mechanism attached to the downstream end of the splinter duct.

FIG. 31 is an end view of the FIG. 30 construction

FIG. 32 is a cross-sectional showing of a trigger mechanism which may be substituted for the trigger mechanism shown in the splitter duct of FIG. 14.

FIG. 33 is a showing of the trigger mechanism of FIG. 32 shown with the splitter duct unrolled for purposes of better illustration.

FIG. 34 shows another embodiment of trigger mechanism of FIG. 14.

FIG. 35 is a showing of a further trigger mechanism modification utilizing plural rows or patterns of helical slots in or near the trailing edge of a splitter duct.

FIGS. 36 and 37 are plan and end views of still another trigger mechanism modififcation of the variety which utilizes both a helically sloted and helically corrugated downstream end on a splitter duct to perform their swirling fluid interface triggering functions.

FIG. 38 is a showing of still another trigger mechanism modification utilizing a combination of helical slots and scooped projections cooperating therewith at the downstream end of a splitter duct to accelerate mixing.

FIG. 39 is a representation of irregular trigger corrugation utilized for the purpose of noise suppression.

FIGS. 40 and 41 depict annular combustion because of the swirling flow therethrough to retard or prevent flow separation of the boundary layers along the diffuser walls.

FIGS. 42a and 42b are showings of an annular combustion chamber utilizing swirl flow and further utilizing a compound vane cascade at the inlet thereof to control the amount of swirling at the various radial stations across the cascade so as to discourage boundary layer flow separation and permit the utilization of shortened diffuser section in the combustion chamber, thereby reducing the length of the combustion chamber.

FIGS. 43 and 44 are showings of the axial velocity profile and tangential velocity profile of the air immediately downstream of the cascade of compound vanes of FIG. 42.

FIG. 45 is a cross-sectional showing of a scooped-aperture which may be used with trigger mechanisms, such as those shown in FIG. 14.

FIGS. 46 thru 48 are showings of annular combustion chambers utilizing radially staged combustion chamber and engine length and having provisions for engine power performance control.

DESCRIPTION OF THE PREFERRED EMBODIMENT

Figure 16:
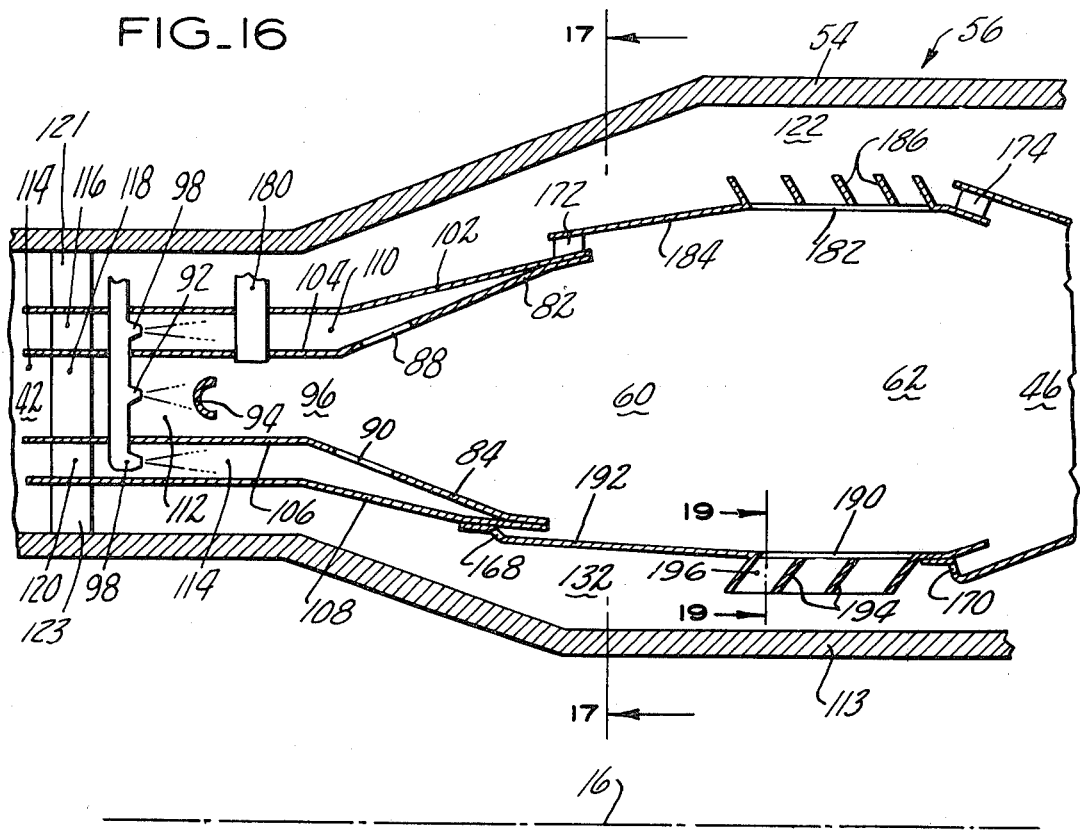
FIG. 16 is a cross-sectional showing of an annular combustion chamber using a barberpole mixer in both the combustion zone and dilution zones thereof.

To fully explain the subject matter of this application it is deemed desirable to first describe the theory involved.

My observation of the dynamic behavior of concentric dissimilar swirling flows leads to the discovery of a fluid interface instability phenomenon that can be used to increase the mixing rate between the dissimilar fluids and which therefore is of particular interest in combustion chambers to accelerate combustion by increasing the mixing rate and hence the effective flame speed and also to accelerate the mixing which takes place in the combustor dilution zone wherein the products of combustion are cooled by mixing with cooling air before being passed through the turbine. As used herein the term dissimilar fluids means fluids which are thermodynamically and aerodynamically dissimilar. This phenomenon of interest and its characteristics will now be described by referring to FIGS. 1 and 2. In these figures, two dissimilar fluids are flowing in concentric swirling flow patterns and are isolated initially by a cylindrical separator wall 10, which is positioned between cylindrical ducts 12 and 14 so that walls 10, 12 and 14 are concentric about centerline or axis 16 and cooperate to define concentric annular passages 18 and 20. While the outer fluid will be described as the hot fluid and the inner fluid the cold fluid, this does not have to be the case. As the swirling fluids pass downstream of the separator termination point 22, interface 24 is established therebetween. As best shown in FIG. 3, the velocity of each fluid may be represented by the flow vector diagram shown where $V_x$ is axial velocity, $V_t$ is tangential velocity in the indicated direction. Fluid flowing in such a manner comes under the primary influence of two forces of significant magnitude, namely, centrifugal forces and forces die to the pressure gradient which exists in the duct through which the fluid is flowing. At a given radius, the centrifugal force, $F_c$, is proportional to the mass of the fluid, and consequently the density, $\rho$, of the fluid, and the square of the tangential velocity or tangential velocity component $V_t$, of the fluid. The pressure gradient force, $F_p$, is proportional to the radial pressure gradient and results from the radial differences in static pressure across the radially projected area of the fluid element. During the passage of the two fluids through annular passages 20 and 18, these forces are in equilibrium, as best shown in FIG. 1 with respect to simulated fluid particles 26 and 28, and the fluid flows in its helical path.

Downstream of separator 10, where both fluids enter common annular passage 30, the two fluids are in direct contact with each other and therefore are capable of influencing one another.

By viewing FIGS. 1 and 4 it should be noted that the static pressure distribution profile 32 for the outer swirling, usually hot fluid is considerable less steep than the static pressure distribution profile 34 of the inner swirling cold fluid, and this is reflected in the magnitude of the pressure gradient force, $F_p$, indicated to be acting upon the outer stream element 28 and the inner stream element 26 in FIG. 1. These pressure gradient forces acting on elements 28 and 26 are balanced by the centrifugal force, $F_c$, action thereon because of the radial equilibrium of each individual stream.

My study and observations have lead me to the discovery that interface 24 between these two dissimilar fluids is unstable if the product parameter $\rho V_t^2$, i.e., the product of the fluid density $\rho$ and the square of the tangential velocity $V_t$ of the fluid, of the outer radial fluid is less than that of inner radial fluid. This instability is demonstrated by introducing a disturbance into the interface 24 such that a local interface convolution 36 projects radially outwardly into the outer radius fluid region. The element of fluid 26' in this projection 36 is exposed to the relatively small radial pressure gradient, $F_{ph}$, of the outer radius fluid region but still retains its high centrifugal force, $F_{cc}$. This establishes an unbalance of forces on element 26' and results in an acceleration of the disturbance radially outward to cause the convolution size and penetration into the outer radius fluid to increase, thereby increasing the rate of mixing between the two fluids. In similar fashion, a convolution 38 of the interface 24 projecting radially inward will result in a force unbalance on fluid element 28' which remains under the relatively small centrifugal force, $F_{CH}$, and comes under the influence of the substantially larger pressure gradient force, $F_{pc}$, and is consequently accelerated radially inward to result in rapid growth of convolution 38 and accelerated mixing between the two streams.

The relative magnitude of the unbalanced forces just described may be assessed by considering the outer fluid as a combusted gas from a combustion chamber which typically would lower the density by a factor of perhaps four relative to the unvitiated innerstream. Since the tangential velocity of the gas in a typical combustion pilot will change relatively to a smaller magnitude, the unbalanced force is seen to be three-quarters or more of the maximum centrifugal force on the two fluids. This magnitude of the unbalanced force is decidedly first order and represents a large acceleration potential available to expedite the radial movement of the two concentric fluids into a helical sheet mode of flow.

My invention is the utilization of this phenomenon in accelerating mixing between two dissimilar swirling fluids in annular combustion chambers of this type used in turbine engines to both accelerate combustion and accelerate the dilution of the hot products of combustion with cooling air before passage through the turbine.

While I have described this mixing phenomenon in FIGS. 1 and 2 in the content of coannular, dissimilar, swirling streams, it should be borne in mind that the same mixing acceleration can be acheived in other environments such as the bent tube environment shown in FIG. 5 wherein both dissimilar streams flow through duct 66 which includes a straight portion 68 and bent portion 70, which has center of curvature 79, and which has splitter or separation member 72 at its upstream end cooperating with duct 66 to define two passages 74 and 76 through which the two dissimilar streams flow with the fluid in the outer passage 74 having lower $\rho V_t^2$ than the fluid in the inner passage 76 so that when the two fluids join in passage 78 they establish the unstable interface and accelerate mixing described in connection with FIGS. 1 and 2 as they become concentric swirling upstream upon entering bent tube section 70, in view of the fact that the product parameter relationship $\rho_h V_{th}^2 < \rho_c V_{tc}^2$, where $\rho_h$ and $\rho_c$ are the density of the hot outer, swirling stream and the cold, inner swirling stream respectively, and $V_{th}$ and $V_{tc}$ are their respective tangential velocities, which are actually their flow-through velocities in the bent tube construction.

This accelerated mixing can also be established by use of the barberpole swirl mixer 80 shown in FIGS. 6 and 7. The term barberpole is selected to describe this mixer because it causes the two dissimilar fluids to form into a series of interdigitated, swirling sheet or fingers. This mixer consists of outer wall 82 and inner wall 84 which preferably diverge to form diverging passage 86 through which the swirling main fluids flow and which have selectively oriented helical slots 88 and 90 extending therethrough, respectively, through which the secondary fluids flow and are caused to enter parallel to the main stream flow. As best shown in FIGS. 7 the direction of helical slots 88 and 90 are such that they are locally parallel to the direction of the swirling main flow. By use of appropriate guide vanes and inlet conditions for the secondary flows the product parameter flow criterian: $\rho V_t^2$ inner secondary $> \rho V_t^2$ main flow and $\rho V_t^2$ outer secondary $< \rho V_t^2$ main flow are attained. With this flow criteria the sheets of secondary flow will penetrate rapidly across the main flow because of the same mixing phenomenon previously described in connection with FIG. 1 and 2 construction occurs here between each swirling fluid sheet and the two swirling sheets of dissimilar fluids adjacent thereto. Accordingly, total required mixing will occur more rapidly. In certain situations, it may be desirable to use a barberpole mixer of the type shown in FIGS. 6 and 7 in which the helical slots are used in one of the walls, 82, or 84 only. In the FIG. 6 and 7 "barberpole" construction, the main flow is preferably hot air and the secondary flows are cooler air and the slots 88 and 90 are oriented about not only helical flow but helical flow substantially parallel to the main flow direction.

Any of these mixers, that is, the concentric mixer barberpole mixer and the bent tube mixer can be effectively utilized in the combustion zone of a combustor or burner to increase the rate of mixing and hence rate of combustion and effective flame speed so as to reduce overall burner length as illustrated in FIGS. 8–12. To emphasize similarity of function the reference numerals of FIGS. 1, 2, 6 and 7 will be repeated in describing the FIGS. 8–12 constructions.

In practice when using these mixers in the combustion zone of a combustor, one of the swirling streams is used as a hot pilot to initiate combustion in the other swirling stream which is a fuel-air mixture. Burning occurs when the two streams mix.

We will now consider which stream to select as the pilot stream.

In the case of the concentric mixers and combustion chambers shown in FIGS. 8 and 9 and the bent tube combustion chamber shown in FIG. 12, it is apparent that the pilot stream should be the outer stream because the density depression caused by heating helps in achieving the desired interfaced instability criteria $\rho V_t^2$ inner $> \rho V_t^2$ outer. In the barberpole mixers and combustors shown in FIGS. 10 and 11, the choice of which stream will act as the heated pilot is not as obvious. In view of the density depression associated with fluid heating, it is apparent that the pilot stream should be one of the streams requiring a low $\rho V_t^2$ product parameter and hence the pilot stream should not be the secondary flow in inner passage 114. The main stream 112 should be chosen as the pilot stream to avoid the severe wall cooling problems which would be caused by injecting a hot gas secondary stream from passage 112 along outer walls 82. In view of the low density of the pilot stream, the product parameter $\rho V_t^2$ for the outer secondary fluid can be made smaller than the product parameter $\rho V_t^2$ of the pilot to obtain the desired rapid mixing by permitting little or no tangential velocity $V_t$ as it passes through slots 88. The desired interface instability criteria between the pilot flow from passage 112 and inner secondary flow from passage 114 is satisfied by the use of the required turning vanes or the like to adjust the tangential velocity ($V_t$) level to satisfy the required criteria $\rho V_t^2$ inner $> \rho V_t^2$ pilot. Of course, the combustion process in the pilot decreases the density of this stream thereby assisting in satisfying this criteria.

FIG. 8 depicts a concentric mixer in a combustion chamber combustion zone where concentric passages 18 and 20 are formed between concentric ducts 12, 10 and 14 and wherein splitter duct 10 terminates short of the outer ducts so that the outer ducts form combustion zone 30 downstream thereof. Appropriately positioned inlet guide vanes or other mechanisms cause swirling fluid to pass through each of passages 18 and 20. The flow in passage 20 serves as the pilot combustion stream in that pilot fuel is injected thereinto through pilot fuel nozzle mechanism 92 which sprays atomized fuel into the fluid passing therethrough just upstream of flameholder 94 to form pilot combustion zone 96 downstream thereof wherein the fuel-air mixture is burned and vitiated after appropriate ignition in combustion zone 96 so that the swirling fluid discharging from passage 20 becomes a pilot to ignite and sustain combustion in the swirling fluid passing through passage 18. This fluid in passage 18 has fuel added thereto by secondary fuel injector 98 to form a fuel-air mixture of the characteristics that the product of its density and tangential velocity squared $\rho V_t^2$ is greater than the corresponding product parameter for the outer swirling pilot stream passage 20 so that accelerated mixing and subsequent combustion takes place between the two fluids in combustion zone 30. The burner shown in FIG. 8 utilizes the premixed burning principle in that fuel is sprayed into the secondary stream 18 prior to entering the mixing and combustion zone 30 and this stream becomes a combustible fuel-air mixture that is subsequently ignited and vitiated when it is mixed with the hot pilot gases or flame from stream 20.

Such a concentric mixer used as a combustor utilizing the diffusion burning principle is shown in FIG. 9. The diffusion burning techniques works on a different principle than the premixed burning technique. In the diffusion burning technique, the pilot fuel from nozzle 92 is fully combusted and fully vitiated in pilot combustion zone 96 such that little or no oxygen remains therein and, accordingly, any fuel added thereto downstream of fully vitiated interface 100 can be vaporized only by the hot products of combustion from pilot zone 96. This phenomenon is taken advantage of in the diffusion burning principle and secondary fuel is discharged into stream 20 by secondary fuel nozzles 101 but this secondary fuel cannot burn until it is mixed with the secondary air being passed in swirl fashion through the stream 18. In this case it will be seen that no fuel whatsoever is directed into stream 18 and that the pilot stream 20 carries not only the heat necessary to initiate combustion and mixing in mixing and combustion zone 20 but also carries the fuel to support this combustion process, when mixed with the air from passage 18.

FIGS. 10 and 11 depict barberpole mixers of the type shown in FIGS. 6 and 7 utilized to form combustion chambers of the premixed burning and diffusion burning variety. In the FIG. 10 construction, ducts 102, 104, 106 and 108 are positioned concentrically about center line 16 to form coannular passages 110, 112 and 114 therebetween. Guide vanes or the like are used to produce swirling flow in passages 110, 112, and 114 to achieve the desired tangential velocity $V_t$ or, as in all other configurations disclosed, this flow may be accepted directly from a compressor which does not have straightening vanes at its outlet. Ducts 104 and 106 join walls 82 and 84 which define passage 86, which is preferably divergent and is the main combustion zone 60. Fuel is sprayed through pilot nozzles 92 into annular passage 112 to be combusted in pilot combustion zone 96 downstream of flameholder 94 to serve as the pilot stream. Secondary fuel is injected into passages 110 and 114 through secondary fuel nozzles 98 in atomized form to be mixed with the air passing therethrough and to pass therefrom through opposed helical slots 88 and 90, respectively, to be discharged as a fuel-air mixture flow substantially parallel to the swirling pilot stream being directed from pilot combustion chamber 96 for accelerated mixing and subsequent combustion with the pilot stream in mixing and combustion zone 60. As in the case of the "barberpole" mixer, the direction of flow of the secondary fuel-air mixture through slots 88 and 90 are adjusted by suitable guide vanes to satisfy the instability criteria $\rho V_t^2$ outer secondary $< \rho V_t^2$ pilot and $\rho V_t^2$ inner secondary $> \rho V_t^2$ pilot.

In the FIG. 10-11 construction, all air entering passage 96 enters with a selectively established tangential velocity $V_t$. This spinning of the air will lower the static pressure in the pilot combustion chamber 96. The premixed fuel-air mixture passing at a larger radius through passage 110 does not necessarily have swirl added thereto. In passage 110 air enters the combustion zone 60 through slots or helical hole pattern 88 in wall 82, such holes 88 are helical in nature or holes or slots designed in helical pattern. This air will accelerate radially through the holes 88 due to the static pressure drop across the holes or slots and once inside primary or pilot combustion zone 60, this air will continue to be accelerated radially inward because of the radial pressure gradient established by the swirling pilot fluid from passage 96 in combustion chamber 86. By admitting this fuel-air mixture through helical slots or holes or slots in a helical pattern, 88, a very rapid combustion pattern of helical layers will be established in the main conbustion zone 60. The fuel-air mixture layers thus formed are burned as interdigitated mixing with the swirling air from the pilot proceeds. As the fuel-air mixture through slot 88 is burned, its radial inward motion is locally further accelerated because the consequent decrease in the density lowers its $\rho V_t^2$ product parameter even further and the radial pressure gradient will accelerate a small portion of burned gas faster than unburned gas. The portion of the fuel-air mixture which passed through helical slots or hole patter 90 has a tangnetial velocity $V_t$ imparted thereto that is sufficiently high for $\rho V_t^2 > \rho V t^2$ of the vitiated pilot gases. Therefore the admitted fuel-air mixture will form helical sheets which will interdigitate with the hot spinning air entering zone 60 from the pilot region 96 and be accelerated radially outward. While the density, $\rho$, of the locally burned surface layer of the swirling fuel-air mixture streams will decrease substantially during burning, it will retain the same tangential velocity, $V_t$, since its angular momentum is unaffected by the change of thermodynamic state. Consequently, the local $\rho V_t^2$ product parameter of the sheets entering through the slots 90 will be substantially reduced and its acceleration due to the radial pressure gradient will aslo be reduced as the sheet burns. However, the unburned portion of the helical layer will continue to be accelerated radially outward, thus continuing to stir the flame front until it is completely burned.

Viewing FIG. 11 we see the barberpole mixer used as a combustion chamber utilizing diffusion burning in which concentric, preferably cylindrical ducts 102, 104, 106 and 108 are positioned concentrically about center liner axis 16 to form coannular passages 110, 112 and 114 therebetween, with ducts 104, 106 extending into preferably divergent walls 82 and 84 to form section 86 which defines the main combustion zone 60. Pilot fuel from nozzles 92 is admitted in atomized form to passage 112 upstream flameholder 94 to be fully combusted and vitiated in pilot combustion chamber 96 so that the products of combustion are fully vitiated upstream at interface 100. Secondary fuel is admitted to annular passage 112 downstream of interface 100 through secondary fuel nozzle 101 to be heated and carried with swirling combustion products of the pilot combustion chamber 96 into combustion zone 60, secondary air is passed through annular ducts 110 and 114 and through opposed helical slots 88 and 90, respectively, into mixing and combustion chamber 60 to be mixed with the hot, fuel rich, flow from pilot stream duct 112. As the mixing process proceeds the excess fuel in the pilot stream comes into contact with the sheets of secondary air entering through slots 88 and 90 and combustion occurs at the multiplicity of interface between these flows.

FIG. 12 depicts a bent tube mixer in the form of a folded burner or combustor of the premixed burning variety. In the FIG. 12 premixed burning configuration, the first fluid is passed through passage 74 to have atomized fuel added thereto from pilot fuel nozzle 92 and so that a pilot combustion zone is established at 96 so as to provide an outer pilot stream entering the curved section 70 of curved duct 66 to serve as a pilot to institute mixing with and subsequent combustion of the fuel-air mixture being introduced through passage 76 into mixing and combustion chamber 30. The fuel-air mixture in passage 76 is generated by the passage of fluid therethrough and the introduction of atomized fuel thereinto through secondary fuel spray nozzles 98.

It will accordingly be seen in the FIG. 12 contstruction that a hot pilot stream is established as the outer swirling stream with respect to the inner colder fuel-air mixture stream, both of which are concentric about center of curvature 79 to cause accelerated mixing and combustion therein in view of the flow criteria $\rho V_t^2$ inner $> \rho V_t^2$ outer. It will be evident to those skilled in the art that the construction shown in FIG. 12 could be made of the diffusion variety by moving pilot fuel nozzle 92 and flameholders 94 farther upstream so that combustion in the pilot combustion zone 96 is completed and a fully vitiated interface corresponding to 100 of FIG. 9 is established sufficiently far upstream of the termination of splitter member 72 that secondary fuel can be injected into passage 74 upstream of the termination of splitter member 72 to be introduced into combustion chamber 30 in uncombusted form for mixing and combusting with secondary air which would flow through passage 76.

To assist in accelerating mixing between the two swirling flows in the concentric and bent tube mixers, it is sometimes desirable to use tripper mechanisms at the end of ducts which serve as splitter ducts between the swirling flow of two different fluids, such as triggers 164 and 166 shown in FIG. 14, to physically disturb the interface between the swirling fluids. A discussion of the theory of operation of these trigger mechanisms is believed to be helpful at this point and reference is first made to FIGS. 10 and 31 in this regard. In FIG. 30 we see trigger mechanism 166 positioned at the downstream end of splitter duct 246 which is of circular cross section and positioned concentrically about axis 16 and cooperates with outer cylindrical duct 248 and inner cylindrical duct 250 to define outer annular gas passage 252 and inner annular gas passage 254. For purposes of illustration, it should be considered that a hot fluid, which is to be the pilot fluid, is passed through passage 252. This hot outer fluid has a density $\rho_h$ and a tangential velocity $V_{th}$. A second fluid, which is preferably a cold (high density) combustible mixture, is passed through inner annular passage 254 and has a density of $\rho_c$ and a tangential velocity $V_{tc}$. To effect accelerated mixing between these two fluids of passage 252 and 256, it is essential that the mixing criteria $\rho_h V_{th}^2 > \rho_c V_{tc}^2$ exists to establish an unstable interface between two swirling fluids. Above and beyond this, the use of trigger 166, which is shown to be a convoluted sheet metal ring member attached to the downstream end of splitter duct 246 further serves to accelerate mixing and combustion. Trigger 166 defines convolutions which follow helical paths growing in amplitude in a downstream direction and as the fluids of passage 252 and 254 pass thereover, a regular pattern of radial fluid motion will be intitiated outwardly and inwardly due to the change of flow direction imparted to the fluids by trigger mechanism 166. The motion thus initiated will grow because of the instability of the interface. Such a trigger mixer has been successfully demonstrated using air at 200°F. and 800°F. as working media.

The amount of tangential mixing induced by fluid shearing at the helical sheet interface will depend upon the difference between the circulation per radian of the fluids in ducts 252 and 254.

The use of trigger mechanisms provides the advantage of controlling the location, size and shape of the disturbance at the interface between the two fluids and it will be appreciated that in construction where trigger mechanisms are not used the disturbance of the interface is caused by turbulence only and is therefore random in nature.

Of particular interest is a piloted combustion application of such a triggered inside-out mixing configuration as shown in FIGS. 30 and 31. Here, the hot vitiated pilot flow would be the outer radius fluid having a low $\rho V_r^2$ product parameter, while the cold combustible mixture would be the inner radius fluid having a high $\rho V_r^2$ product parameter. FIG. 31 is a showing of the combustion-pilot primary combustion zone downstream of trigger 166. The flame front where active combustion occurs is located at the interface 255 and 253, respectively, of the triggered helical sheets of hot pilot flow from duct 252 and cold combustible mixture flow from duct 254. As shown in FIg. 31, the flame speed, F/S, moves against the trigger helical current of the combustible mixture flowing radially outward and into the hot mass of pilot flow. As the combustion occurs at the flame front, elements of air undergo an abrupt density change in a high centrifugal field with resultant release of the acceleration potential to magnify the local turbulence and effective flame speed. This local stirring action, i.e., increased turbulence, is superimposed upon the interface of the triggered mixing of the initial hot pilot and cold combustible mixture flows. The triggered hot pilot gas from passage 252, which comprises a radially inward directed current has an interface flame speed that moves with the current, as well as laterially into the unburned mixture. Again, the local magnitude of turbulence is increased at the flame front by the abrupt fluid density changes in a strong centrifugal field which increases the effective flame speed. The difference in circulation per radian for the initial hot pilot flow and cold combustible mixture provides a superimposed tangential mixing through tangential shearing action.

Figure 20:
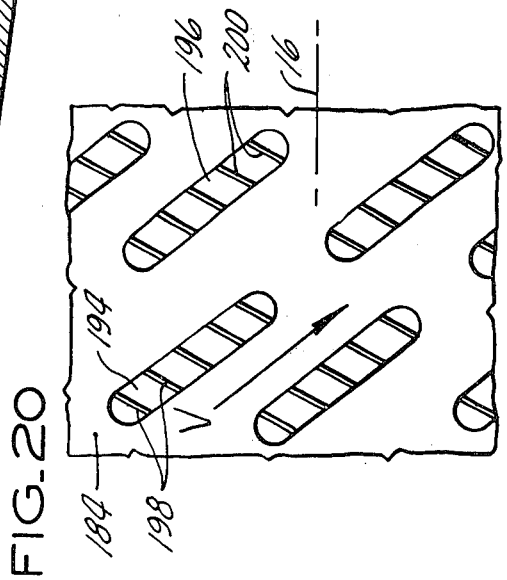
FIG. 20 is a modification of the helical slots shown in FIG. 18 and can be used in the barberpole mixer either in the combuston zone or in the dilution zone of an annular combustion chamber.

Another trigger mechanism, which could be used as a substitute for trigger 166 in the FIG. 14 and 20 construction, is shown in FIGs. 32 and 33. As shown in FIG. 32, splitter duct 246 and ducts 248 and 250 are used in the same fashion as in the FIG. 20 construction. Hot products of combustion flow between ducts 246 and 248, while the cooler fluid, such as a fuel-air mixture, flows in the passage between ducts 246 and 250. Trigger mechanism 258 is located at the downstream end of splitter duct 140 and consists of a series of oppositely oriented vane 260 and 262 pairs forming vortex generators which are spaced circumferentially about splitter duct and extending radially outwardly from the splitter duct and in any desired number of axially spaced rows. Once again, it is the object of trigger mechanism 258 to convolute the interface between the hot products of combustion flowing on one side of splitter duct and the cooling air or fuel-air mixture flowing in passage 130 on the other side of the splitter duct so as to take advantage of the mixing criteria in that the $\rho V_r^2$ product parameter of the hot gases flowing at the greater radius is less than the $\rho V_r^2$ product parameter of the cold air or fuel-air mixture flowing at a lesser radian at the interface therebetween and any convolution will react with the respective pressure gradients in the hot and cold regions to cause radial mixing currents with cold air currents moving into the hot flow in helical sheets and the hot fluid currents moving into the cold region in helical sheets. The flow at the interface downstream of the tripper plane is unstable and the trigger configuration establishes the helical sheet mixing patterns. This mixing occurs from the inside (minimum radial station) to the outside (maximum radial station) and shortens the length of the combustion chamber and engine by accelerating the mixing process.

Referring to FIG. 34 we see still another modification of a splitter duct trigger which could be used in place of trigger 166 of FIG. 14. The trigger of FIG. 34 consists of a series of helically oriented and circumferentially positioned slots 260 at the downstream end of splitter duct 140. The slots are preferably oriented to be parallel to the direction of flow, V, of either the hot or cold gas streams and serves to trigger or disturb the unstable interface which exists between the swirling hot gas flow from the combustion chamber flowing outside splitter duct 140 and the swirling colder air of the cooling gas stream flowing inside of the splitter duct 140 so as to accelerate intermixing.

An additional trigger embodiment is shown in FIG. 35 wherein a plurality of helically extending and circumferentially positioned slots 262 are positioned forward or upstream of slots 260 of the type shown in FIg. 34. Thereby adding to the mixing advantage of the trigger device by utilizing plural slot rows and/or patterns.

Still a further trigger configuration is shown in FIGS. 36 and 37 wherein slots comparable to slot 260 of FIG. 34 are fabricated so as to be elongated and are circumferntially positioned helical slots 264. In this configuration, the after end of splitter duct 140 is fabricated, as shown in FIG. 37, to be corrugated in shape so that the FIG. 36 and 37 trigger is a combination of the slotted trigger of FIG. 34 and the convoluted trigger of FIG. 30.

Still another form of trigger is shown in FIG. 38 wherein scoops 266 are added to helical slots 268, which are comparable to slots 260 of FIGS. 34 and 35 and which serve to scoop the cold spinning air from a construction comparable to the FIG. 14 construction flowing on the outside of splitter 140 into the hot region radially inward of the splitter duct 140 where the products of combustion from combustion chamber 60 flow, thus triggering the mixing pattern downstream of the splitter duct plane. This FIG. 38 construction will set up helical spinning layers of hot and cold air to mix downstream of the splitter duct. While but a single row of such scooped slots are shown in FIG. 38, it shold be realized that more than one row or a pattern thereof could be used, as is shown in FIG. 35 without scoops.

For improved acoustic properties and for improved combustion of the trigger 166, it is recommended that trigger 166 be made of sheet metal with a series of small holes 257 therein and preferably, scoop member 259 (see FIG. 53) to be associated with holes 257 to force small jets from the cold side of the trigger to flow to the hot side to cool the trigger and to also introduce a fine scale of distrubance or turbulence to improve combusion.

As mentioned previously, acoustic benefit can be gained by utilizing perforations in the corrugated trigger of the type shown in FIG. 50 and this is important because large amplitude nose has been shown to affect combustion efficiency adversely. Additional noise suppression can be achieved by varying the height and width (distance between) of the trigger corrugations or other trigger mechanisms, and also varying the cycle of the trigger pattern peripherally to achieve noise suppression, thus producing spiraling or helical sheets of hot and cold gases having different frequency response.

Such a configuration is depicted in FIG. 39 wherein $h$ represents height or amplitude of the convutions and $l$ and $m$ represent different corrugation widths.

An engine of the type in which my invention may be used is shown in FIG. 13 as turbine engine 40, which consists of a compressor section 42, a burner or combustion section 44, a turbine section 46, and may have a afterburner section 48, which terminates in a variable area nozzle 50. Engine 40 is preferably of circular cross-section and concentric about axis 52. Combustion section 44 includes outer casing 54 and and annular combustor combustion chamber or burner 56, which consists of diffuser inlet section 58, combustion zone 60 and dilution zone 62. As used herein, the term "annular combustion chamber" means a combustion chamber having an annular passage extending from the inlet, or upstream end, to the outlet, or downstream end thereof. Fuel is supplied to combustor 56 by variable output fuel pump 64 which is either under pilot manual or pilot set automatic control, and is fed into the inlet of combustor 56 in a fashion to be described hereinafter, to be mixed therewith a portion of the pressurized gas from compressor section 42 to form a combustible fuel-air mixture to be burned in combustion zone 60, from which the products of combustion pass into dilution zone 62 for mixing with dilutant cooling air also from the compressor to lower the temperature thereof prior to entry into turbine section 46. Engine 40 may be of the type more tully described in U.S. Pat. Nos. 2,747,367, 2,711,631 and 2,846,841.

A typical combustor system or section 44 of a turbine engine of the type shown in FIG. 13 may be considered to be composed of two components in series, namely, a combustion zone 60 in which fuel is burned in a portion of the total engine air flow from the compressor and a dilution zone 62 in which the balance of the air flow is mixed with the hot products of combustion from the combuation zone so that a substantially cooler mixture than the products of combustion is passed through the turbine 46. Any combination of concentric mixtures, barberpole mixers, and bent tube mixers, can be used to perform the combustion zone region mixing and combustion function and the dilution zone region mixing and cooling functions of such a combustion section 44.

Referring to FIG 14 we see annular combustion chamber 56 which comprises outer case 54 and inner case 113, which are preferably of circular cross-section and mounted concentrically about axis or center line 16. The air from the compressor section 42 of FIG. 13 enters annular inlet 114 in either swirling flow or non-swirling flow depending upon the discharge conditions from the compressor section 42, and portions thereof pass through pilot passage 124, main combustion zone fuel preparation passage 126 and the dilutant air passage 130. Further quantities of air flow through passages 122 and 132 to provide for cooling the walls of the combustor chamber. Vanes 116, 118, 120 and 128 are employed as required to swirl or straighten the flow in the respective passage so as to satisfy the previously defined mixing instability criteria. Each of the passages 122, 124, 126, 130 and 132 are o annular shape since the outer burner liner 134, the inner burner liner 136 and splitter ducts 138 and 140 are of circular cross-section and concentric about axis 16. Turning vanes 116 and 118, 120 and 128 may be fixed or any or all vanes could be of the variable angle type as shown, for example, in FIG. 15 wherein each of vanes 116 is pivotally connected to duct 134 and outerhousing 54 by pivot pins 144 and 146, respectively. Pivot pin 146 extends through outer case 34 and carries ring gear 148 at its outer end, which engages circumferentially rotatable ring or annular gear 150, which is pilot operated to rotate circumferentially about axis 16 by motion of pilot actuated lever 152 into and out of the plane of the paper, thereby causing vanes 116 to rotate in unison and thereby vary the tangential velocity $V_t$ of the gas or fluid passing thereby. The swirling air which entered passage 124 has atomized fuel added thereto fuel injection device 156 to form a fuel-air mixture which is ignited by ignitor 158 and vitiated in pilot combustion chamber 160 which is located downstream of aperture-type flameholder 161, which is a tilted and apertured plate extending between ducts 134 and 148. The hot swirling stream emerging from passage 124 serves as a pilot stream for combustion chamber 60. The swirling air entering passage 126 has atomized fuel added thereto by injection member 162 and the amount of fuel to be discharged into passage 125 and 126 can be regulated by the size and number of fuel nozzles, such as 162 located therein and by pilot controlled valves 163 and 165 located in the fuel line thereto. The atomized fuel entering pasage 126 mixes with the swirling passing therethrough to provide a combustible fuel-air mixture to combustion chamber 60 for accelerated mixing pilot stream emerging from passage 124 and subsequent combustion of this flow. It will accordingly be seen that hot swirling pilot stream emerging from passageway 124 to mix with the sustain combustion in the fuel-air mixture emerging from passageway 126 and the thermodynamic and aerodynamic characteristics of these two streams are established so as to satisfy the rapid mixing certeria $\rho V_t^2 > \rho V_t^2$ outer. This may be attained by adjusting the tangential velocity $V_t$ in each stream through a suitable selection of the discharge angle of the vanes 118 and 120. It should be noted that the combustion process in the pilot duct 124 depresses the density $\rho$ of this stream relative to that in duct 126 which assists in satisfying the desired rapid mixing criteria. The projects of combustion from conbustion zone 60 then pass into dilution chamber 62 in swirling, concentric flow relationship to the cooling air being passed into dilution zone 62 through cooling air passage 130 to again satisfy the aforementioned unstable interface product parameter criteria $\rho V_t^2$ (cooling air)$< \rho V_t^2$ (products of combustion) between the swirling product of the combustion stream and the swirling cooling air stream to accomplish accelerated mixing and hence accelerated reduction of the temperataure of the products of combustion before passage into turbine section 46.

It will therefore be seen that in the FIG. 14 configuration, the unstable interface criteria between two swirling, dissimilar fluids is used in the concentric mixer hardware shown therein to constitute the combustion zone and the dilution zone of an annular combustion chamber.

The means and method for establishing, regulating or varying the density and tangential velocity of the swirling fluids described in connection with FIG. 14 can also be used with all other constructions previously described or to be described hereinafter.

Trigger members 164 and 166 are positioned at the downstream end of splitter ducts 138 and 140 to perform a function to be described in particularity hereinafter.

The cooling air from passage 132 passes through apertures 168 and 170 in inner liner 136 to perform a cooling function with respect to the liner. The outer liner is cooled by cooling air from passage 122 which is passed through vane cascades 172, 174, and 176 to cause the cooling air to flow along the inner wall of outer liner 134. The angularity of the vanes in the cascade is selected so that a stable interface criteria exists between cooling air and the hot gasses of the combustion chamber, that is, so that the product $\rho V_t^2$ (cooling air) $> \rho V'^2$ (combustion gas). Apertures 168 and 170 of the inner liner 136 may be replaced by vane cascades such as 172 and a stable interface would be established by selective van positioning so that $\rho V_t^2$ (products of combustion) $> \rho V_t^2$ (cooling air).

Figure 17:
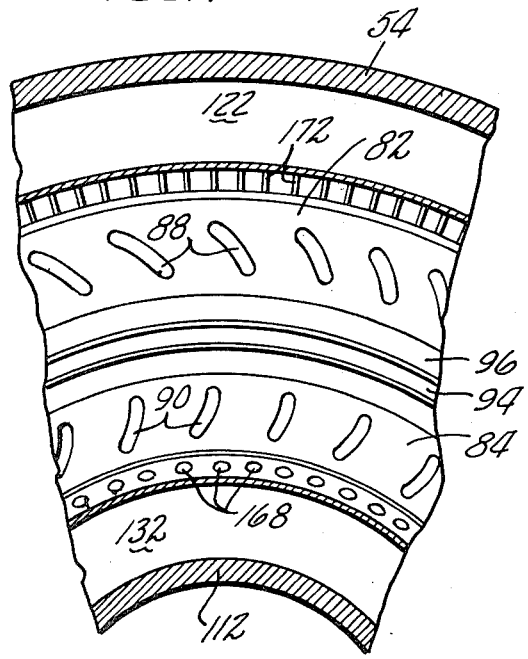
FIG. 17 is taken along lines 17—17 of FIG. 16.

Referring to FIg. 16 we see another annular burner but this time of the type in which both the mixing and the combustion zone and the mixing in the dilution zone is accomplished by means of a barberpole mixer. Again the combustor 56 includes outer housing 54 and inner housing 113. The air again enters annular inlet 114 from compressor section 42 and after a portion of the flow is mixed with fuel and combusted in combustion chamber 60 and having the products of combustion diluted in dilution zone 62, the hot gases then pass through turbine section 46. The air from inlet 114 flows either through selectively positioned guise vanes 121 and 123 into cooling annular passage 122, annular cooling passage 132, respectively, or through selectively positioned guide vanes 116, 118, 120 as required into combustion zone 60. Vanes 116 through 123 could as well be the variable area type shown in FIG. 15. The barberpole mixer for combustion zone 60 operates much as previously described in connection with the comparable premixed combustor mixer application shown in FIG. 10 and comparable reference numerals will be repeated to emphasize similarity. The air which passes vanes 116 and 120 enter annular passages 110 and 114 respectively, and have fuel added thereto be secondary fuel nozzles 98 before passing through helical slots 88 and 90 into divergent section 60 as swirling fuel-air mixtures of the tangential velocity $V_t$ of which has been established so as to produce the desired product parameter $\rho V_t^2$. As best shown in FIG. 17, helical slots 88 and 90 are directed locally parallel to the direction of the flow leaving passage 112 and are shown in opposite directions and while but a single row of slots is shown in both outer duct 82 and inner duct 84, it should be borne in mind that any number of rows of slots or slot patterns could be selected. The remainder of the inlet air passes through guide vanes 118 as required has fuel added thereto through the fuel nozzles 92 and is ignited by ignitor 180 to establish a swirling pilot flame in combustion zone 96 entering the main combustion section 60 with selected $\rho V_t^2$ product parameter, that is, so that product parameter $\rho V_t^2$ for the inner fuel-air mixture from passage 114 is greater than the product parameter $\rho V_t^2$ for the pilot zone from passage 112, which is in turn greater than the product parameter $\rho V_t^2$ of the outer fuel-air mixture from passage 110 to produce acelerated compound, radially staged mixing and combustion to combustion zone 60 from which the product of combustion then pass into dilution zone 62.

Figure 18:
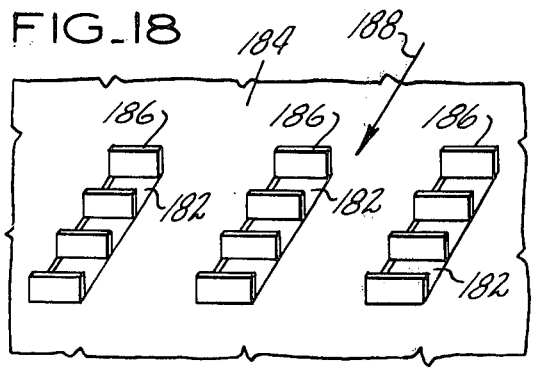
FIG. 18 is an enlarged, unrolled showing of the combustion chamber outer liner of FIG. 16 to illustrate the orientation of the outer liner helical slots in the barberpole mixer of the dilution zone.
Figure 19:
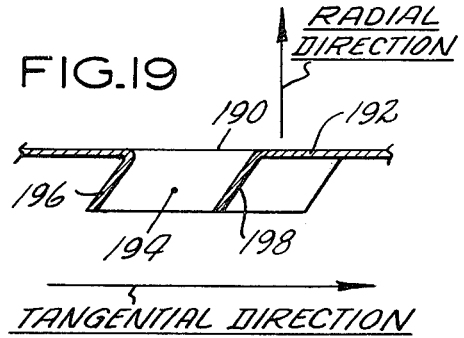
FIG. 19 is a cross-sectional showing of the vaned, helical slots used in the inner wall of the dilution zone mixer of FIG. 16 and is taken along lines 19—19 of FIG. 16.

Cooling air enters dilution zone 62 from cooling passage 122 through a plurality of helical slots such as 182 which extends about the periphery of outer line 184 and includes inlet guide vanes 186 extending across passages 182 to control the direction of flow inlet in cooperation with the helical slots 182. An unwrapped view of liner 184 is shown in FIG. 18 and the direction of local flow along the inner liner 184 is shown by arrow 188 in direction V (see FIG. 3) with slots 82 helically inclined to axis 16 and extending in the local flow direction V Guides 186 are selected to direct the dilutant coolant flow into dilutant zone 62 from cooling air annulus 122 in the desired direction, that is, with little or no tangential velocity so as to satisfy the desired accelerated mixing by satisfying the mixng criteria that the $\rho V_t^2$ product parameter of the dilutant flow from passage 122 is less than the $\rho V_t^2$ product parameter of the products of combustion. Similarly, a series of helical slots 190 are positioned in inner liner 92 and a series of such slots extend circumferentially around the periphery thereof and include inlet guides 194. An unwrapped view of inner liner 192 will show that slots 190 are similar slots 182 of the outer liner 184 and guide vanes 194 are similar to guide vanes 186, except that it is desirable that slots 192 and guide vanes 196 cooperate to produce a dilutant or coolant flow into the dilutant zone 62 which has a high tangential velocity $V_t$ and therefore, as best shown in FIG. 19, the guide vanes 194 include side guides 196 and 198 to produce the desired tangential velocity $V_t$ to satisfy the mixing criteria that the $\rho V_t^2$ product parameter of the cooling air or dilutant passing through slots 90 is greater than the $\rho V_t^2$ product parameter of the products of combustion in dilutant zone 62. The products of combustion so diluted by compound, radial staged mixing then pass into turbine 46. It will be noted that in the combustion chamber construction shown in FIG. 16, barberpole mixing from both walls is shown both in the combustion zone and in the dilutant zone. To be specific, mixing occured in the combustion zone both between the pilot zone flow from passage 96 and the fuel-air mixture entering through slots 88 and 90. It will be noted that similar mixing occurs through radially spaced slots 182 and 190 in dilution zone 62.

It should be noted that while a particular type of guided vane slot is shown in connection with the FIG. 16-19 construction, multiple slots can also be employed in the combustion or dilution zones, as best shown in FIG. 20 where a plurality of vaned, helical slot rows are utilized.

As previously described in connection with FIG. 14, cooling air enters the interior of outer liner 184 of FIG. 16 through selectively positioned guide vanes 172 and 174 so as to hug the interior wall of liner 184 for liner cooling purposes. In similiar fashion, cooling air enters dilution zone 62 through apertures 168 and 170 to perform the function of cooling inner liner 192.

Figure 21:
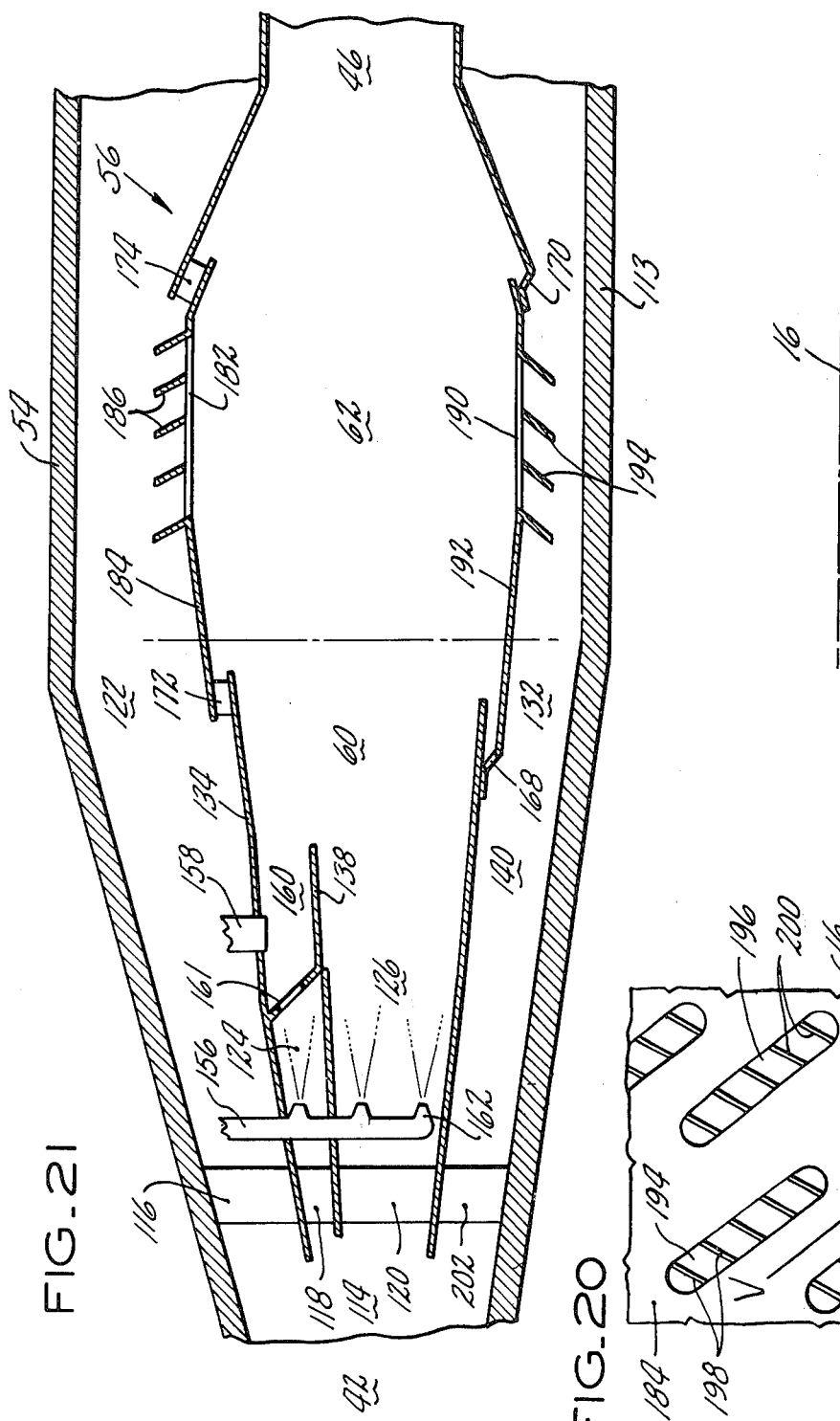
FIG. 21 is a cross-sectional showing of an annular combustion chamber having axially staged combustion and dilution zones and utilizing a concentric mixer in the combustion zone and a barberpole mixer in the dilution zone.

Now referring to FIG. 21, we see another modification of my annular burner wich utilizes a concentric mixer in the combustion zone and a barberpole mixer in the dilution zone. In operation, the concentric mixer of the combustion zone is the same as the mixer previously described in connection with the combustion zone of the burner of FIG. 14 and the barberpole mixer in the dilution zone is the same as previously described in connection with the dilution zone mixer of FIG. 16, The same reference numbers will be used herein, as in FIGS. 14 and 16 and a brief description only of the operation will be given here and reference directed to the previous detailed descriptions. Again, the compressed air from the compressor, which may or may not be swirling depending on the discharge conditions from the compressor, enters annular inlet 114 and then divides to pass through vanes 116 and 202 and enter either annular cooling passages 122 or 132, respectively, or through inlet guide vane 118 and 120 to have fuel added thereto by fuel spray nozzle 162 to form pilot combustor 160 in annular passage 124 the hot gases from which mix with the sustain combustion in the fuel-air mixture passing through passage 126. The products of combustion then pass into dilution zone 62 for accelerated mixing with the cooling or dilutant air from passages 122 and 132 which enter through the previously described slots 182 and 190 to form helical sheets of cooling air to interdigitate with the products of combustion in the dilution zones 62 for accelerated cooling thereof prior to passage into the turbine 46. In all other respects the concentric mixer of the combustion zone 60 and the barberpole mixer of the dilution zone 62 of the FIG. 21 construction are fabricated and operate as previously described in connection with the concentric mixer of combustion zone 60 of FIG. 14 and the barberpole mixer of the dilution zone 62 of FIG. 16.

Once again, the important feature is to control the $\rho V_t^2$ product parameter of the swirling streams so as to accelerate mixing therebetween as required and described supra primarily by the use of vanes 116, 118, 120 and 202, as required.

Figure 22:
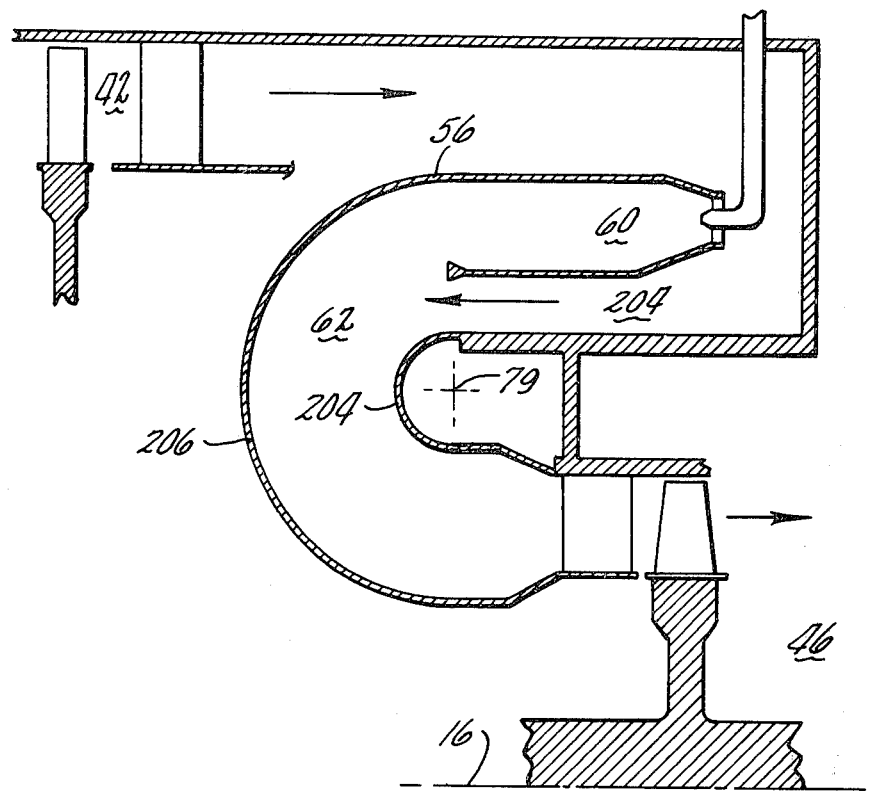
FIG. 22 is a cross-sectional showing of an annular combustion chamber having a conventional combustion zone and dilution zone of the folder burner of bent tube variety utilizing my invention.

Referring to FIG. 22, we see a modification in which a bent tube mixer is used to form the dilution zone in a folder burner or combustion chamber. In the FIG. 22 construction, annular bent tube or folded combustion chamber 56 is positioned between compressor 42 and turbine 46 and includes combustion zone 60 of any selected type, such as a conventional combustion zone chamber as shown in U.S. Pat. No. 3,498,055, a concentric mixer combustion zone shown in FIG. 14 or a barberpole mixer combustion zone shown in FIG. 16. The portion of the compressed air from compressor 42 which does not go through combustion zone 60 flows as coolant or dilutant flow through annular passage 204 and enters dilution zone 62 with the products of combustion from combustion zone 60 but a smaller radius with respect to center of curvature 79, about which coannular bent ducts 204 and 206 are concentric as previously described in connection with FIG. 12. The swirling motion about center of curvature 79 imparted to the dilutant flow and the products of combustion in bent tube dilution zone 62 establishes the accelerated mixing criteria required in this construction wherein the $\rho V_t^2$ (dilutant flow)$>\rho V_t^2$ (products of combustion) to effect maximum mixing and hence cooling of the products of combustion before passing through turbine 46.

It will be evident to those skilled in the art that following the teachings of my invention, either the combustion zone or dilution zone can be conventional as taught in U.S. Pat. No. 3,498,055, and the nonconventional zone, whether combustion or dilution zone, can be either of the concentric mixer construction, the barberpole mixer construction, or the bent tube mixer construction previously described.

While a particular type of pilot combustor is shown and described in the concentric mixer used in the combustion zone of the FIG. 14 construction, there are modifications which can be used as the pilot combustor construction in this concentric mixer environment and these modifications will now be discussed.

In configurations using the previously described premixed principle, where vanes are used, it may be of advantage in injecting the fuel upstream of the vanes. These advantages include the fact that the presence of the vanes beteween the fuel source and the combustion zone will prevent flashback from the combustion zone to the fuel nozzle location. Secondly, secondary flows will be established in the vane passage to assist fuel atomization and disperson. Examples of this type of construction are shown in FIG. 23 for a burner using a concentric mixer and in FIG. 29 for configurations using a barberpole mixer.

Figure 23:
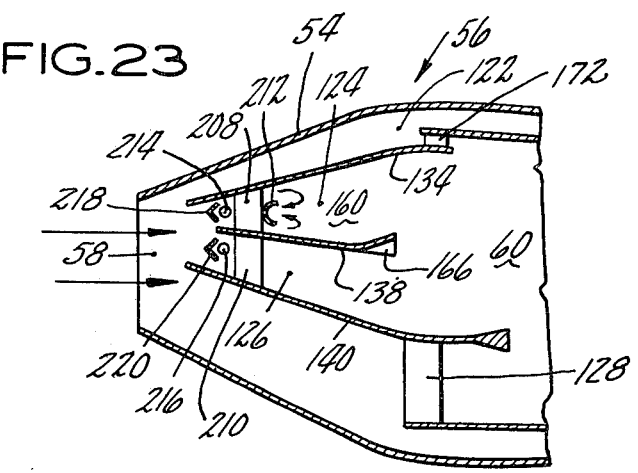
FIG. 23 is a modification of the primary combustor portion of the combustion zone mixer shown in FIG. 14.

FIG. 23 shows fuel injection forward of the flow turning vanes in a combustion chamber using a concentric mixer and could be used as a substitute for the FIG. 14 mixer. The remainder of combustion chamber 56 is as shown in previously described FIG. 14, FIG. 23 shows a primary combustion zone for a swirl type annular combustion chamber. Pilot zone 124 is used in conjunction with secondary fuel-air mixture preparation zone 126. The turning vaned cascades 208 and 210 are shown at the same axial stations but may be displaced axially if desired. In the FIG. 23 construction the vane cascades 208 and 210 are positioned close to the entrance of diffuser section 58 to impart additional swirl velocity to the incoming air beyond what is imparted thereto by the compressor 42 and could simultaneously diffuse the axial component $V_x$ of the total gas velocity. Fuel is injected upstream of cascades 208 and 210 through apertured fuel manifold rings 214 and 216 which spray fuel forwardly against splash plates 218 and 220 to be atomized in this fashion and carried through vanes 208 and 210 into passages 124 and 126. Thus fuel injection mechanism may be of the type taught in U.S. Pat. No. 3,269,115. Fuel injection mechanism 214 is preferably placed in alignment with the flameholder 212, to minimize drag and aid in maintaining stable combustion on said flameholder. It should be noted that when the cascades 208 and 210 are used, thus there is no change in static pressure, and the axial velocity $V_x$ component is reduced at the same time that the tangential or swirl velocity $V_t$ is increased. Since a small rise in static pressure can be tolerated in the cascade, when properly designed the cascade is a more effective method of reducing velocity $V_x$ than the basic diffuser itself, within the limits of the desired magnitude of tangential velocity $V_t$ of the gas. It is preferable that the vanes of cascades 208 and 210 be closely spaced so that a flame trap is simultaneously achieved. The higher velocity gas flow through the closely spaced vanes of cascades 208 and 210 will prevent flashback of the flame from the combustion chamber to the fuel nozzles. A small trough-shaped flameholder ring 212 is positioned concentrically about the axis 16 and is utilized to stabilize the recirculation zone 160 of the pilot zone. Recirculation affects axial velocity $V_x$ only, and has no effect upon the swirl velocity $V_t$.

An ignitor such as 158 of FIG. 14, ignites the fuel-air mixture in passage 126 for accelerated mixing and combustion in combustion zone 60. A trigger 166 may be utilized if desired.

Figure 28:
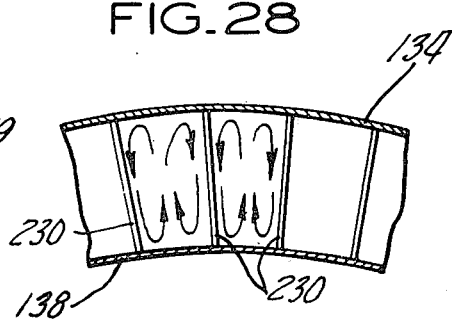
FIG. 28 corresponds to FIG. 27 and shows the secondary flow patterns between the helical guide vanes.

The second advantage to be gained in the FIG. 23 construction by positioning turning vanes 208 between the combustion chamber 60 and the fuel injection means 214 is best illustrated by referring to FIG. 28. As best shown in FIG. 23, the helically disposed vanes 208 generate boundary layers along their radial surfaces which interact with the pressure gradients in the gas flow passing between the vanes to generate a secondary flow pattern shown in FIG. 28. This pattern stirs the droplets and vapor of the fuel-air mixture to effect a more uniform mixture as well as accelerate fuel droplet evaporation. Downstream of vanes 208, the vane wakes continue to react with the radial pressure gradient and the secondary flow resulting from this interaction moves helically in a pattern downstream of the helical vanes. The same secondary flow recirculation pattern illustrated in FIG. 28 and described above in connection with vanes 208 will also be occuring between vanes 210 in the FIG. 23 configuration.

The barberpole construction utilizing fuel injection upstream of the flow turning vanes to achieve advantages of the flashback abatement and secondary flow fuel dispersion assist is shown in FIG. 29.

The FIG. 29 construction is a modification to the barberpole mixer of the combustion section of the FIG. 15 construction. In this construction of the modified annular burner, which operates like the previously described FIGS. 10-11 constructions, and corresponding reference numbers will be used where possible, the combustion air which enters annular inlet 114 with virtually no swirl in it passes either into cooling annular passages 122, 130 or 132 and the remainder passes into the divergent portion 58 of the combustion chamber 56. Atomized fuel is added to the air early in the diffusion process by conventional fuel nozzle manifolds 224. The manifolds being placed so that one or more serves each passage. A cascade of turning vanes 234 is located at the entrance of annular passage 124, which defines pilot zone 160 and in passing through vanes 234, the air is caused to swirl as it flows into the early sections of the diffuser shaped pilot combustion zone 160. A conventional flameholder ring of trough-shaped cross-section 212, which could be V- or U-shaped or round, is positioned radially mid-way of vane cascade 234 to stabilize a recirculation zone for supporting combustion downstream thereof after the fuel-air mixture is ignited by an appropriate sparking device, such as spark plugs 228. The annular construction of passage 124 will result in flow recirculating rearwardly of flameholder 212. The premixed fuel-air mixture passing at a larger radius through passage 236 does not have swirl added thereto and may have residual swirl removed therefrom by vane cascade 235. In passage 236 air enters the combustion zone 160 through slots 88. The portion of the fuel-air mixture which passes through vaned cascade 240 has a tangential velocity $V_t$ imparted thereto equal to or greater than that of the vitiated pilot gases and this swirling mixture from cascade 240 is introduced through helical slots 90 into the main combustion chamber 60 at a $\rho V_t^2$ product parameter higher than that of the hot products of combustion entering zone 60 from the pilot. The operation of the FIG. 29 construction is as previously described in connection with FIGS. 10-11 except that fuel is injected upstream of the turning vanes to gain the two advantages discussed above.

Figure 24:
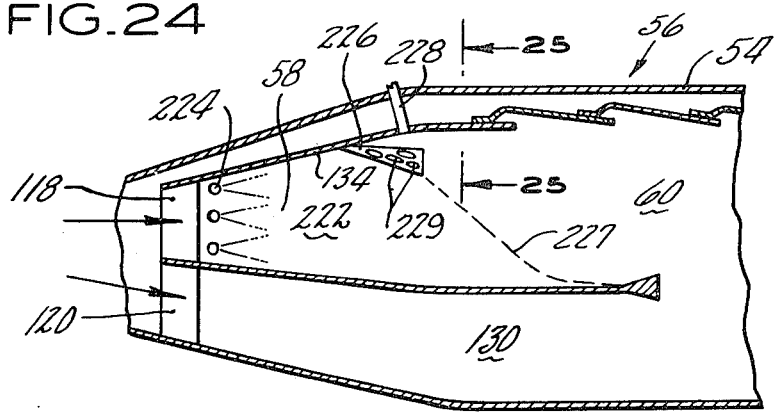
FIG. 24 is a modificaton of the concentric mixer used in the combustion zone chamber which may be substituted for the type shown in FIG. 14.
Figure 25:
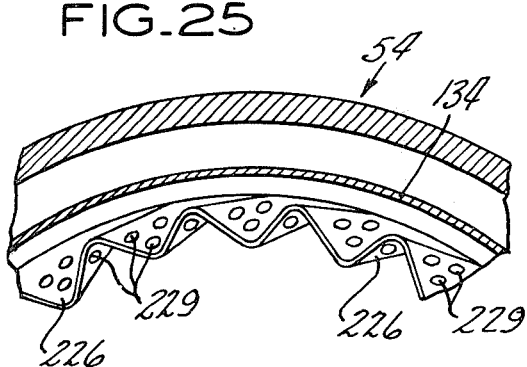
FIG. 25 is an enlarged, partial, cross-sectional showing of the flameholder member taken along line 25—25 of FIG. 24.

A modification of my swirl burner concentric combustion zone mixer of the type shown in FIG. 14 is shown in FIG. 24. In the FIG. 24 construction, turning vanes 118 and 120 may be used at the entrance of the diffuser section 58 of annular combustion chamber 56 to impart the necessary swirl to the incoming air, if the normal compressor air does not have the proper swirl for the particular environment. Fuel is added to the air passing through annular passage 222 as spray from conventional fuel spray manifolds, such as 224. Instead of the use of a splitter duct, such as duct 138 of FIG. 14, the FIG. 24 modification proposes a selectively shaped and positioned flameholder mechanism 226, which is shown as a combined flameholder trigger mechanism, to cooperate with spark plug 228 in igniting and sustaining combustion in the swirling fuel-air mixture passing through passage 222. As best shown in FIG. 25, flameholder 226 is preferably shaped to constitute a spiral (helical) type of convoluted flameholder ring attached to and carried by the outer burner case 134. The helical orientation of the convolutions of flameholer 226 are selected to essentially conform with the helical path of the fuel-air mixture, direction V of FIG. 3, flowing in passage 222 in the vicinity of the flameholder. Flameholder 226 has a plurality of holes or slots 229 therein through which a premixed and preferably all vaporized or partially vaporized, fuel-air mixture passes to burn inside and downstream of flameholder 226. The hot combusted gases passing out of and downstream of the flameholder also have a tangential velocity component $V_t$ imparted thereto by the shape of the convolutions of the flameholder and by their initial swirl. The product of the density, $\rho$, and the tangential velocity, $V_t$, squared, that is, the product parameter $\rho V_t^2$ of the hot mixture downstream of the flameholder is established to be smaller than the comparable product parameter of the fuel-air mixture passing outside of the flameholder and, accordingly, at the interface 227 just downstream of this convoluted flameholder 226, the hot gases of combustion and the unburned fuel-air mixture mix and burn rapidly as a result of this product parameter difference. Accordingly, rapid mixing and combustion takes place in the combustion zone 60 for eventual mixing and dilution of the products of combustion thereof with the mixing air passing through passage 130 as in the FIG. 14 construction. In the FIG. 24 construction, a spirally shaped flameholder serves to hold pilot flame and physically disturb the unstable interface between the pilot products of combustion and fuel-air mixture, and thereby trigger this instability to accelerate mixing and combustion.

Figure 26:
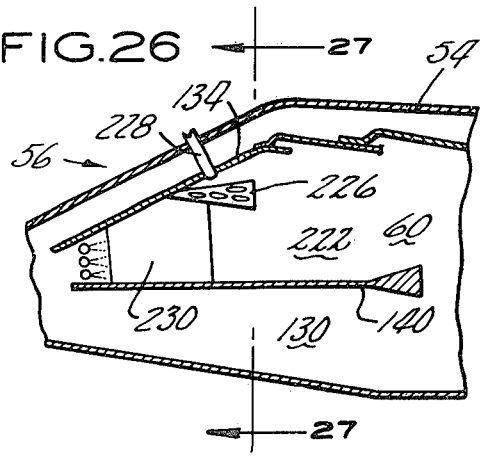
FIg. 26 is a showing of a modification of the combustor shown in FIG. 25.
Figure 27:
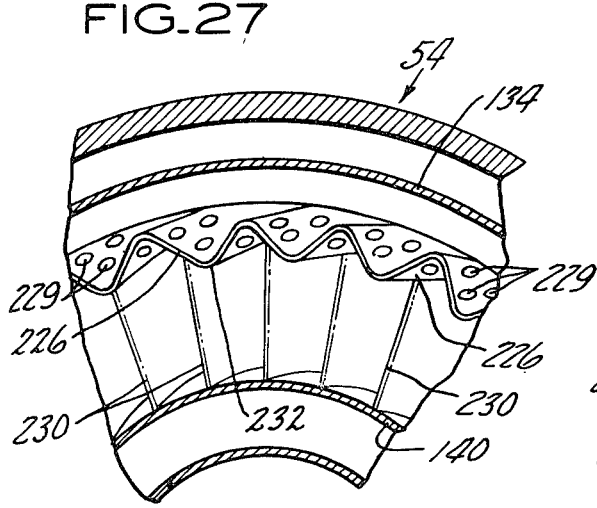
FIG. 27 is an enlarged showing of FIG. 26 construction taken along line 27 of FIG. 26.

A variation of my FIG. 24 construction is shown in FIGS. 26 and 27. This construction is otherwise similar to the FIG. 25 and the FIG. 14 construction, and operation is the same. The advantage taught in the FIGS. 26-27 modification is that when inlet turning vanes are required they may be selectively positioned and used in conjunction with the helical, spiral flameholder 226 of FIG. 25. Vanaes 230 are helically disposed at the entrance portion of combustion chamber 56 and generate secondary flows inside the vane defined passages previously described in connection with FIG. 28 and to continue this secondary flow pattern downstream of the vane passages so that the triggering or mixing function of the helically disposed and convoluted pilot combustion chamber is enhanced.

The helically disposed vanes 230 generate boundary layers along their radial surfaces which interact with the radial pressure gradient of the gas flow passing through passage 222 to generate a secondary flow pattern shown in FIG. 28. This pattern stirs the droplets and vapor of the fuel-air mixture to effect a more uniform mixture as well as accelerate fuel droplet evaporation. Downstream of vanes 230, the vane wakes continue to react with the radial pressure gradient and the secondary flow resulting from this interaction moves helically in a pattern downstream of the helical vanes. By having the helical vanes 230 oriented so that their radial intersection with the spiral, convoluted and perforated flameholder 226 occurs at the flameholder troughs 232 and the trailed edge of vane 230 is upstream of the end of flameholder 226, the result is that the trailing secondary flows align themselves to foster and assist the mixing instigation or triggering action of flameholder 226. It will accordingly be seen that the spirally shaped turning vanes 223 coact with the spirally shaped flameholder 226 to foster and hot products of combustion fuel-air mixture mixing and burning function of the flameholder.

My experience has further shown that a swirling type combustion chamber of the type taught herein leads itself to effecting improved diffuser performance in a manner now to be described.

As best shown in FIG. 40, the diffuser section 58 of annular combustion chamber 56 is define between outer wall 268 and inner wall 270 which cooperate to form divergent diffuser section 58. Swirling air enters diffuser section 58, either due to compressor swirl or swirl imparted thereto by inlet guide vanes (not shown) and establishes a mixing criterion wherein the boundary layer is unstable at the outer wall 268 in that, $\rho V_t^2$ for the boundary layer air is less than $\rho V_t^2$ for the main stream air. This phenomenon alone will substantially increase the mixing rate at the outer wall and allow a higher static pressure gradient axially along the wall before flow separation occurs. However, triggering the unstable boundary layer with knubs 272, which are preferably formed in axially spaced circumferentially directed rows as best shown in FIGS. 40 and 41, will increase the mixing rate substantially and will increase the rate of fluid momentum transfer to the boundary layer region from the main stream, thus permitting a still higher rate of diffusion without separation of the flow from the outer wall 268.

In addition, by positioning the inner wall 270 of annular diffuser 58 so that its radial distance, that is the distance from the engine center line 16, decreases along the axis in the direction that air travel will result in decreasing the inner wall static pressure gradient in the axial direction. This is accomplished, as best shown in FIG. 40 by making radius $r_2$ less than radius $r_1$. This results from the local acceleration of the tangential component of the velocity, $V_t$, from consideration of the principle of conservation of angular momentum. This allows means for alleviating the axial static pressure gradient which affects, as regards separation, only the axial velocity component. Accordingly, a more rapid deceleration of the axial velocity, $V_x$, is permitted which is along the inner wall.

I have further found that an annular burner of swirl flow configuration of the type taught herein lends itself to permitting the utilization of a very wide and short cone angle diffuser to reduce burner length. This can be accomplished in an annular burner using swirling flow by preventing or retarding separation of the boundary layers along the walls of the diffuser. It is common practice ot energize boundary layers by blowing from a slot in the surface but this requires an expenditure of power to pump the blown air. In a diffuser passing swirling flow, the axial boundary layer is prone to separation and the kinetic energy of the tangential motion in the boundary layer does not provide any assistance in overcoming the adverse pressure gradient. However, if this energy is directed into the axial boundary layer, energization of the axial boundary layer is obtained without the expenditure of external pumping power. The essential feature is not the energization of the axial boundary layer itself, but the means of accomplishing it by straightening the boundary layer at the diffuser inlet and effectively adding the kinetic energy of the tangential boundary layer to that of the axial. The straightening can be accomplished in either of two ways. If the approaching flow is axial and is to be turned by vanes in the diffuser inlet these vanes are uncambered or cut back at the diffuser inlet walls to permit a continuing axial flow in these regions. Conversely, if the approach flow is already swirling, short vanes are mounted on the wall at the diffuser inlet to straighten the flow near the wall only. These vanes should not be confused with the vortex generators of FIG. 33 which enhances diffuser performance by promoting turbulence downstream through break-up of their tip vortices. Geometrically, these turning vanes would be cambered to provide a low angle of attack on the leading edge and provide an axial discharge, while vortex generators are usually airfoils of low camber set at a high angle of attack to the approaching flow in opposing pairs.

Constructions using proper vanes are shown in FIGS. 42a and 42b. The 42a construction is intended for use with air which is to be swirled upon entering diffuser section 58. In this construction, a compound stator or vane cascade 274 is placed at the diffuser inlet and is shaped to permit axial flow past the upper and lower edges of the gas flowing therepast so that nonswirling air flows along the outer diffuser wall 276 and the inner diffuser wall 278, while imparting swirling flow to the central portion of the diffuser, 58, thus establishing velocity profiles of axial velocity, $V_x$, and tangential velocity, $V_t$, as shown in FIGS. 43 and 44, respectively. The permissable amount of diffusion and consequently the loaction of separation is determined by the axial velocity $V_x$ distribution principally. Since the greatest part of the $V_x$ distribution shown in FIG. 43 is in the center portion of the diffuser inlet and determines the static pressure rise in the diffuser. The wall boundary layers have a larger axial component $V_x$ than the central portion and therefore a greater amount of energy permitting them to continue flowing against the adverse pressure gradient thereby delaying or avoiding flow separation. Consequently, the diffuser cone angle can be increased substantially without flow separation.

FIG. 42b shows the vane construction intended for use in an embodiment in which swirling air is being passed from compressor 42 into diffuser 58. A plurality of flow straightening vanes 277 and 279 are positioned at the inlet of the diffuser 58 and serve to remove the tangential velocity $V_t$ from the air passing thereby so that axially directed air only will be passed along the diffuser wall. Ring shaped covers 281 and 283 preferably extend concentrically around axis 16 and attach to the free ends of vanes 277 and 279, respectively, and serve to prevent the formation of vane tip vortices. This is a material distinction between the function of straightening vanes 277 and 279 and the function of vortex generators, in that the formation of tip vortices is the primary action of vortex generators.

In both FIGS. 42a and 42b constructions, by diverting a part of the energy in the tangential boundary layer into the axial boundary layer, a means of energizing the axial boundary layer has been obtained similar to that employed in blowing along the boundary but without the expenditure of external power.

Another advantage of my annular swirl burner construction is that the length of the combustion chamber and the engine can be reduced and/or improved control of the power performance of the engine can be achieved by radially staged combustion. Illustrations of annular combustion chambers having radial combustion staging therein are shown in FIGS. 46–48 and, since these constructions are similar in detail in the FIG. 14 construction, except for the radial combustion staging, common reference numerals will be used wherever applicable.

As best shown in FIG. 46, primary combustion zone 60 and dilution zone 62 are axially oriented in series within housings 54 and 113 which are concentric about axis 16. The annular dilution zone 62 is defined between outer liner 134 and inner liner 136, which are concentric about axis 16. Ducts 138, 140 and 400 are preferably of circular cross-section and positioned concentrically about axis 16 within outer liner 134, with duct 140 extending farther downstream than duct 138 and duct 400 extending farther downstream than duct 140. Pilot combustion zone 160 is defined between duct 138 and 134 in annular passage 124 and the annular pilot is established therein due to the coaction of fuel spray member 156 and flameholder member 161. Annular passage 402 is defined between ducts 138 and 140 and constitutes the outer main stream through which a swirling fuel-air mixture flows, with fuel spray mechanism 404 discharging atomized fuel thereinto. Annular passage 406 is defined between ducts 140 and 400 to constitute the inner main stream of swirling fluid with atomized fuel sprayed thereinto by fuel spray means 408. Flow turning vane cascades 116, 118, 120, 410 and 128 are located at the inlet portion 114 of combustion chamber 56 to receive the air from compressor 42 and change its direction as required to establish the desired tangential velocity $V_t$, of the fluid flowing past the vane. The compressor air which passes vanes 116 flows between the outer burner casing 54 and the outer liner 134 to cool both parts and flows through vanes 172-176 along the interior wall of the outer liner, as previously described, for liner cooling purposes. Part of the air which flows through vanes 128 enters cooling air passage 132 to cool the inner burner casing 113 and the inner burner liner 136 and through vanes 168 and 170 to cool the inner surface of the inner liner 136. The remainder of this cooling air, that which does not pass through passages 132 after passing vanes 128 passes into dilutant air passage 130 to be mixed with the products of combustion from combustion chamber 60 in dilution zone 62. The air which passes vanes 118 has fuel added thereto as it passes fuel injection mechanism 156 and has a stabilization zone created therein downstream of aperture plate flameholder 161 so that when ignited by mechanism such as 158 of FIG. 14, a primary combustion zone of flame is formed at 160.

In practice in the FIG. 46 construction, the pilot combustion zone or flame at zone 160 will remain in operation at all times. When more power is required from the engine, fuel is commenced to be injected through fuel injection mechanism 404 so that the fuel-air mixture passing from annular passage 402 will be ignited by, mixed with, and burned with the pilot flame from 160 in a portion of the primary combustion zone designated as 60$a$. When still further engine power is required fuel is also discharged into annular passage 406 by fuel spray mechanism 408 to mix with, be ignited by the combust with the products of combustion from primary combustion zone 60$a$ in secondary combustion zone 60$b$. It will therefore be noted that there are three main power output possibilities for the engine in which the FIG. 46 construction is used, the first when the pilot flame in passage 124 only is being used, second when combustion is taking place in passage 124 and 402, and third when combustion is taking place in passage 124, 402 and 406. In fact, since the flow in each fuel stream can be modulated within its range of stable operation, there are enumerable power levels at which the engine utilizes the FIG. 46 construction of operation. The addition of a second combustor doubles the stable range for the entire burner.

Dilution air from passage 130 will mix with and cool the products of combustion from primary combustion zone 60 in dilution zone 62 before entering turbine 46. As described before, the flow turning vanes 116, 118, 120, 410 and 128 are selected so as to establish the product parameter inequality $\rho V_t^2$ (dilution air) $< \rho V_t^2$ (second primary combustion zone 60$b$) $< \rho V_t^2$ (first primary combustion zone 60$a$) $> \rho V_t^2$ (pilot flame 160).

Trigger mechanisms 164, 166 and 169 may be of the type previously described and performs the previously described functions.

When there is no fuel added in passages 402 or 406, of FIG. 46 these streams act like a dilutant stream in that they will rapidly mix with the hot gas from the passages radially outboard thereof.

It will be evident that the FIG. 46 construction is much like the FIG. 14 construction except that the main fuel preparation stream is divided into two main streams in passages 402 and 406, to be ignited and burned, when required, from a pilot flame immediately radially outboard thereof. In the FIG. 54 construction, the main advantage to be gained is the improved power control in that combustion is taking place in the main pilot 160 at all times and solely therein at the lower power levels, in pilot zone 160 and 60$a$ combustion zone portions 60a at the intermediate power levels, and in pilot combustion zone 160, main combustion zone portion 60$a$ and main combustion zone portion 60$b$ at the high power levels. In this manner, the range of power levels attainable is roughly double that of the FIG. 14 burner.

FIG. 47 shows another concentric burner construction with radial staging for combustion and this construction is similar to the FIG. 14 construction except for the radial staging of the concentric mixer in the combustion zone. The previous description relative to the construction of the inner and outer burner liners 134 and 136 and its cooling vanes 168-176 will suffice to describe the FIG. 55 construction as well, and the compound concentric mixer only will be described. FIG. 47 is actually two concentric mixers located in radial orientation to one another and has the advantage of shortening the combustion chamber and engine length by shortening the radial distance across which the flame must propagate during combustion. In this construction, outer concentric mixer 420$a$ is positioned concentrically about axis 16 and envelopes inner concentric mixer 420$b$, which similarly concentrically envelopes axis 16. The outer mixer includes ducts 134, 138$a$ and 140$a$, which are preferably of circular cross-section and concentric about axis 16 and cooperate to define annular passages 124$a$ and 126$a$ therebetween. Flameholder 161$a$, which is preferably of the perforated plate type, extends across passage 124$a$ and is operable to define a pilot combustion zone 160$a$ downstream thereof. Inner concentric mixer 420b includes ducts 140a, 138b and 140b, which are preferably of circular cross-section and concentric about axis 16, and cooperate to define annular passages 160b 126b therebetween. Flameholder 161b extends across passage 124b to define pilot combustion zone 160b downstream thereof. Flow turning vane cascades 116, 118a, 120a, 118b, 120b and 128 serve as previously described to impart the required tangential velocity $V_t$ to the fluid passing therethrough. Fuel is injected into annular passages 124a and 124b through fuel injection nozzle system 422 and is ignited to conventional fashion downstream of flameholders 161a and 161b extending in annular fashion about axis 16. A swirling fuel-air mixture, due to the action of the turning vanes and fuel injection mechanisms 424 and 426, pass through passages 126a and 126b and mix with, are ignited by, and burn with the products of combustion of pilot combustion zone 160a and 160b, respectively. Trigger mechanisms 164, 166 and 169 may be of any of the types previously described. The turning vanes are selectively oriented such that the product parameter $\rho V_t^2$ of the fuel preparation passages 126a and 126b is greater than the product parameter $\rho V_t^2$ of the pilot combustion zones 160a and 160b, respectively, to accelerate mixing and buring therebetween and, similarly the product parameter $\rho V_t^2$ of the dilutant air passing through passage 130 is greater than the corresponding product parameter of the flow leaving zones 60a and 60b.

The construction shown in FIG. 48, which also corresponds generally to the construction in FIG. 14 except for the radially staged concentric mixer 430 which forms the forward part of combustion zone 60. This FIG. 56 embodiment has the advantage of both shortening the length of the combustion chamber and hence the engine and of providing for multiple power operation control of the power plant. This construction is sufficiently similar to the FIG. 14 construction that the construction and the operation of the inner and outer liners 136 and 134 which are as previously described, will not be described again here. The description of FIG. 48 will be confined to the compound, radially staged concentric mixer 430. This mixer, basically, includes an annular pilot combustion zone defining mechanism, with fuel preparation annular passages located immediately radially outboard and inboard thereof to both mix, be ignited by, and burn with the pilot flame. Ducts 134, 442, 444 and 446 are concentrically positioned about axis 16 and cooperate to define annular pilot combustion zone passage 124 and outer and inner annular fuel preparation passages 126a and 126b therebetween. Fuel is injected into the pilot passage 124 through fuel injection means 448 and passes through flameholder 161 to establish pilot combustion zone and pilot flame 160 downstream thereof. Fuel injection mechanism 450 injects fuel into outer annular fuel preparation passage 106a and fuel injection mechanism 452 injects atomized fuel into inner annular fuel preparation passage 126b. Turning vane cascades 116, 118 and 120 are used to provide the required tangential velocity $V_t$ to accomplish the desired intermixing in these annular chambers. Turning vanes 115 and 128 provide a similar function with respect to the cooling air going through passages 122, 130 and 132. to accelerate mixing, ignition and combustion between the pilot flame and its products of combustion and the fuel-air mixtures of passages 126a and 126b, the interface instability criterion $\rho V_t$ (passage 126b) $> \rho V_t$ (pilot flame and products of combustion) $> \rho V_t$ (passage 126a). Trigger mechanisms 164 and 166, which may be any of the types described previously perform the function of disturbing the interface between the pilot flame and the fuel-air mixtures of passages 126a and 126b to accelerate mixing and burning. Trigger 169 performs a similar function between the products of combustion of main combustion zone 60 and the dilutant air entering the dilution zone 62 through annular passage 130.

In the FIG. 48 construction, multipowered operation can be achieved by keeping the pilot flame at 160 in operation at all times and in use solely for lower power operation, by cutting the fuel supply to either passage 126a or 126b for intermediate power operation, and cutting in the fuel supply in both of the fuel preparation passages 126a and 126b for high power operation.

It will therefore be seen from the foregoing that there are many advantages to be gained from a swirl burner configuration both with respect to mixing the fuel-air mixture for burning and vitiating in the combustion zone and for mixing the hot products of combustion and the cooling air in the dilution zone to cool the products of combustion prior to passage through the turbine section. It will further be seen that many modifications of swirl burning are available.

I wish it to be understood that I do not desire to be limited to the exact details of construction shown and described, for obvious modifications will occur to a person skilled in the art.

I claim

1. A folded combustion chamber including:
   A. a duct having a bend therein of at least 90°,
   B. combustion chamber means and a dilutant flow passage located juxtaposition at the upstream end of said duct,
   C. means to pass the products of combustion from said combustion chamber means of density $\rho_1$ through duct bend,
   D. means to pass a dilutant fluid of density $\rho_2$ through said dilutant flow passage to establish an interfere between said products of combustion and dilutant fluid,
   E. said duct bend being of selected curvature such that a tangential velocity $V_{t1}$ is imparted to the products of combustion passing therethrough and a tangential velocity $V_{t2}$ is imparted to the dilutant fluid passing therethrough and so that the product parameter $\rho_2 V_{t2}^2$ is greater than the product parameter $\rho_1 V_{t1}^2$ to accelerate intermixing between said products of combustion and said dilutant fluid in said duct bend so that said duct bend serves as a dilution zone to cool said products of combustion.

2. Apparatus according to claim 1 wherein said combustion chamber means, said dilutent flow passage and said duct are of annular shape and wherein the flow of said diluent fluid through said duct bend is at a lesser radius of curvature than the flow of the products of combustion through said duct bend, and including trigger means supported from the downstream end of said combustion chamber means and shape to disturb the interface between the products of combustion and the diluent fluid to accelerate mixing therebetween.

* * * * *

UNITED STATES PATENT OFFICE
CERTIFICATE OF CORRECTION

PATENT NO. : 3,919,840
DATED : November 18, 1975
INVENTOR(S) : Stanley J. Markowski It is certified that error appears in the above-identified patent and that said Letters Patent are hereby corrected as shown below:

Column 1, line 8    Delete "3,778,065" and insert --3,788,065--

Signed and Sealed this sixth Day of April 1976

[SEAL]

Attest:

RUTH C. MASON
Attesting Officer

C. MARSHALL DANN
Commissioner of Patents and Trademarks